US011622239B2

(12) United States Patent
Liu et al.

(10) Patent No.: US 11,622,239 B2
(45) Date of Patent: Apr. 4, 2023

(54) TRS FOR MULTICAST AND BROADCAST

(71) Applicant: QUALCOMM Incorporated, San Diego, CA (US)

(72) Inventors: Le Liu, Fremont, CA (US); Alberto Rico Alvarino, San Diego, CA (US); Tao Luo, San Diego, CA (US); Xiaoxia Zhang, San Diego, CA (US); Kazuki Takeda, Tokyo (JP); Wanshi Chen, San Diego, CA (US); Mostafa Khoshnevisan, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/084,590

(22) Filed: Oct. 29, 2020

(65) Prior Publication Data
US 2021/0136532 A1 May 6, 2021

Related U.S. Application Data

(60) Provisional application No. 62/929,745, filed on Nov. 1, 2019.

(51) Int. Cl.
H04W 4/06 (2009.01)
H04W 72/12 (2009.01)
(Continued)

(52) U.S. Cl.
CPC ............ H04W 4/06 (2013.01); H04W 48/10 (2013.01); H04W 72/1273 (2013.01); H04W 72/1289 (2013.01)

(58) Field of Classification Search
CPC ... H04W 4/06; H04W 48/10; H04W 72/1273; H04W 72/1289; H04W 36/0007; H04W 72/005; H04L 5/0094; H04L 5/0048
See application file for complete search history.

(56) References Cited

U.S. PATENT DOCUMENTS

2015/0146604 A1* 5/2015 Kim ...................... H04L 1/1671
370/312
2017/0367110 A1* 12/2017 Li .......................... H04W 4/70
(Continued)

FOREIGN PATENT DOCUMENTS

CN 107231619 A * 10/2017
EP 2830237 A1 1/2015
(Continued)

OTHER PUBLICATIONS

International Search Report & Written Opinion dated Feb. 15, 2021 from corresponding PCT Application No. PCT/US2020/058371.

Primary Examiner — Sharmin Chowdhury
(74) Attorney, Agent, or Firm — ArentFox Schiff LLP

(57) ABSTRACT

A base station may transmit a broadcast/multicast service in a multicast broadcast single frequency network (MBSFN) area multicast communication. A method of wireless communication at a base station in accordance with an aspect of the present disclosure comprises determining a broadcast/multicast service to be provided to a user equipment (UE) in a multicast broadcast single frequency network (MBSFN) area, and transmitting a tracking reference signal (TRS) to the UE, the TRS indicating information associated with receiving the broadcast/multicast service by the UE.

29 Claims, 19 Drawing Sheets

(51) Int. Cl.
    *H04W 48/10*     (2009.01)
    *H04W 72/1273*     (2023.01)

(56) References Cited

U.S. PATENT DOCUMENTS

| | | |
|---|---|---|
| 2018/0035340 A1* | 2/2018 | Fujishiro ................. H04W 4/06 |
| 2019/0069284 A1* | 2/2019 | Wang ................. H04L 25/03866 |
| 2019/0215117 A1 | 7/2019 | Lee |
| 2019/0261244 A1 | 8/2019 | Hyejung |
| 2019/0297629 A1* | 9/2019 | Lin ..................... H04W 72/005 |
| 2020/0106551 A1* | 4/2020 | Shi ...................... H04W 72/042 |
| 2021/0111849 A1* | 4/2021 | Yang ..................... H04L 5/0091 |
| 2021/0127450 A1* | 4/2021 | Abdoli ................. H04W 72/042 |
| 2021/0153162 A1* | 5/2021 | Chen ..................... H04W 68/005 |
| 2021/0167930 A1* | 6/2021 | Jeon ..................... H04L 27/2607 |
| 2022/0158793 A1* | 5/2022 | Selvaganapathy .. H04W 56/001 |
| 2022/0210614 A1* | 6/2022 | Wang ..................... H04W 4/50 |

FOREIGN PATENT DOCUMENTS

| | | | |
|---|---|---|---|
| WO | 2019-067925 A1 | | 4/2019 |
| WO | WO-2021051322 A1 | * | 3/2021 |

\* cited by examiner

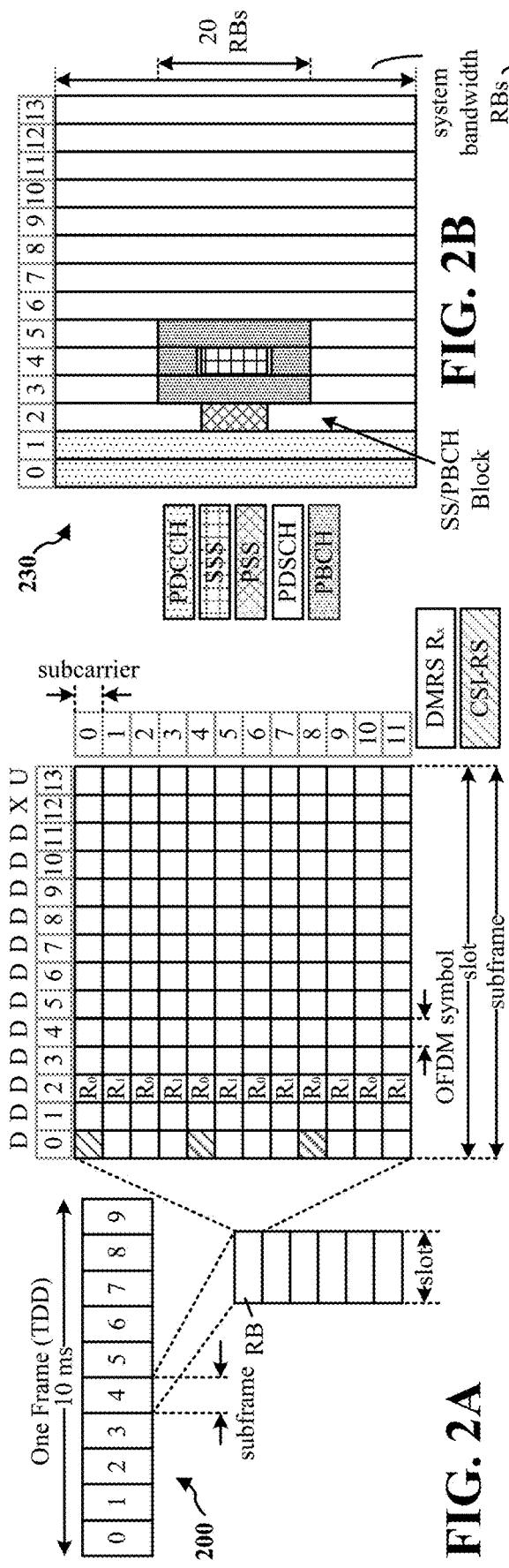
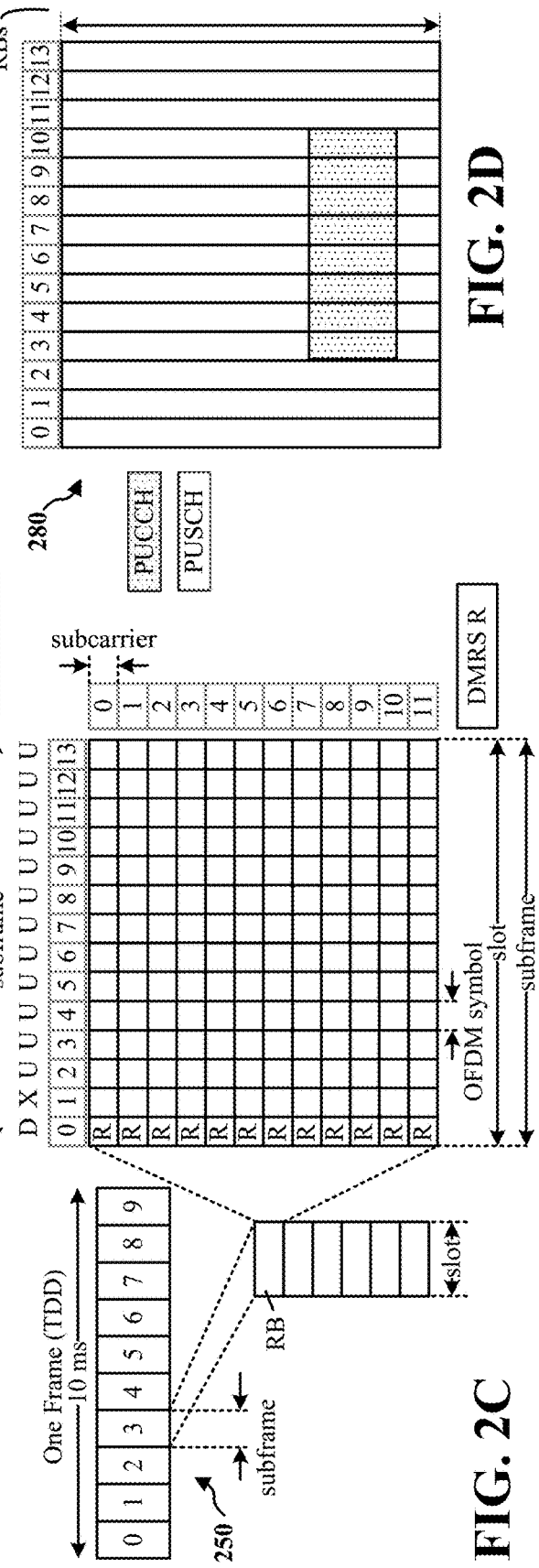
FIG. 2A
FIG. 2B
FIG. 2C
FIG. 2D

TRS FOR MULTICAST AND BROADCAST

CROSS-REFERENCE TO RELATED APPLICATION(S)

This application claims the benefit of U.S. Provisional Application Ser. No. 62/929,745, entitled "TRS FOR MULTICAST AND BROADCAST" and filed on Nov. 1, 2019, which is expressly incorporated by reference herein in its entirety.

BACKGROUND

Technical Field

The present disclosure relates generally to wireless communication, and more particularly, to a tracking reference signal for broadcast/multicast communication.

Introduction

Wireless communication systems are widely deployed to provide various telecommunication services such as telephony, video, data, messaging, and broadcasts. Typical wireless communication systems may employ multiple-access technologies capable of supporting communication with multiple devices by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

Wireless communication may also include the transmission of a number of signals that coordinate and/or control the user equipment (UE) that is communicating on a wireless telecommunications system. One of those signals may be transmitted by a base station, and may be known as a tracking reference signal (TRS). A TRS may enable a UE to synchronize with or track the base station signals, even if the UE is in an idle or inactive state.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some example wireless communications systems, such as various radio access networks, a set of base stations may provide services through broadcast/multicast communications. Such broadcast/multicast communications services may include streaming video (e.g., mobile television), gaming, video calling, and so forth.

A set of base stations may transmit data and/or control information for broadcast/multicast communications to a set of UEs operating in cells respectively provided by the set of base stations. For example, a base station may transmit at least one tracking reference signal (TRS) in a cell provided by the base station to enable a user equipment (UE) to perform synchronization or tracking in order to receive the wireless communications data and/or control information for broadcast/multicast communications. According to one aspect of this disclosure, a base station may transmit data and/or control information related to a broadcast/multicast service in a multicast broadcast single frequency network (MBSFN) area. According to another aspect of the disclosure, the base station may further transmit a TRS for communicating such information related to the broadcast/multicast service to idle or inactive UEs (e.g., UEs operating in an RRC state of RRC_IDLE or RRC_INACTIVE). In some aspects, a source base station may transmit, in a source cell, TRS configuration information for a target MBSFN cell to a connected UE (e.g., a UE operating in an RRC state of RRC_CONNECTED).

Wireless communications, such as broadcast/multicast communications, may be transmitted by a group of base stations. According to some radio access technologies, such as 5G New Radio (NR), a serving cell may transmit a TRS to enable RRC_CONNECTED UEs to perform synchronization and/or tracking in order to receive unicast transmissions, e.g., in addition or alternative to broadcast/multicast service transmissions.

In some aspects, the TRS may include a periodic TRS, and the base station may configure periodic TRS parameters in system information or control information carried on a multicast control channel (MCCH). In some aspects, the TRS may include a semi-persistent TRS, and the base station may configure semi-persistent TRS parameters in system information or control information on an MCCH. For example, a semi-persistent TRS may be activated for a UE using information included in a medium access control (MAC) control element (CE) (MAC-CE). In some aspects, the TRS may include an aperiodic TRS, and the base station may configure aperiodic TRS parameters in system information or control information on an MCCH. For example, an aperiodic TRS may be triggered for a UE based on downlink control information (DCI).

In an aspect of the disclosure, a method, a computer-readable medium, and an apparatus are provided. The apparatus may be a base station. The apparatus may be configured to determine a broadcast/multicast service to be provided to a UE in a MBSFN area, and transmit a TRS to the UE, the TRS indicating information associated with receiving the broadcast/multicast service by the UE.

In another aspect of the disclosure, another method, another computer-readable medium, and another apparatus are provided. The other apparatus may be a UE. The other apparatus may be configured to receives a TRS from a base station associated with a MBSFN area providing a broadcast/multicast service for the UE. The other apparatus may be further configured to receives the broadcast/multicast service based on the TRS.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
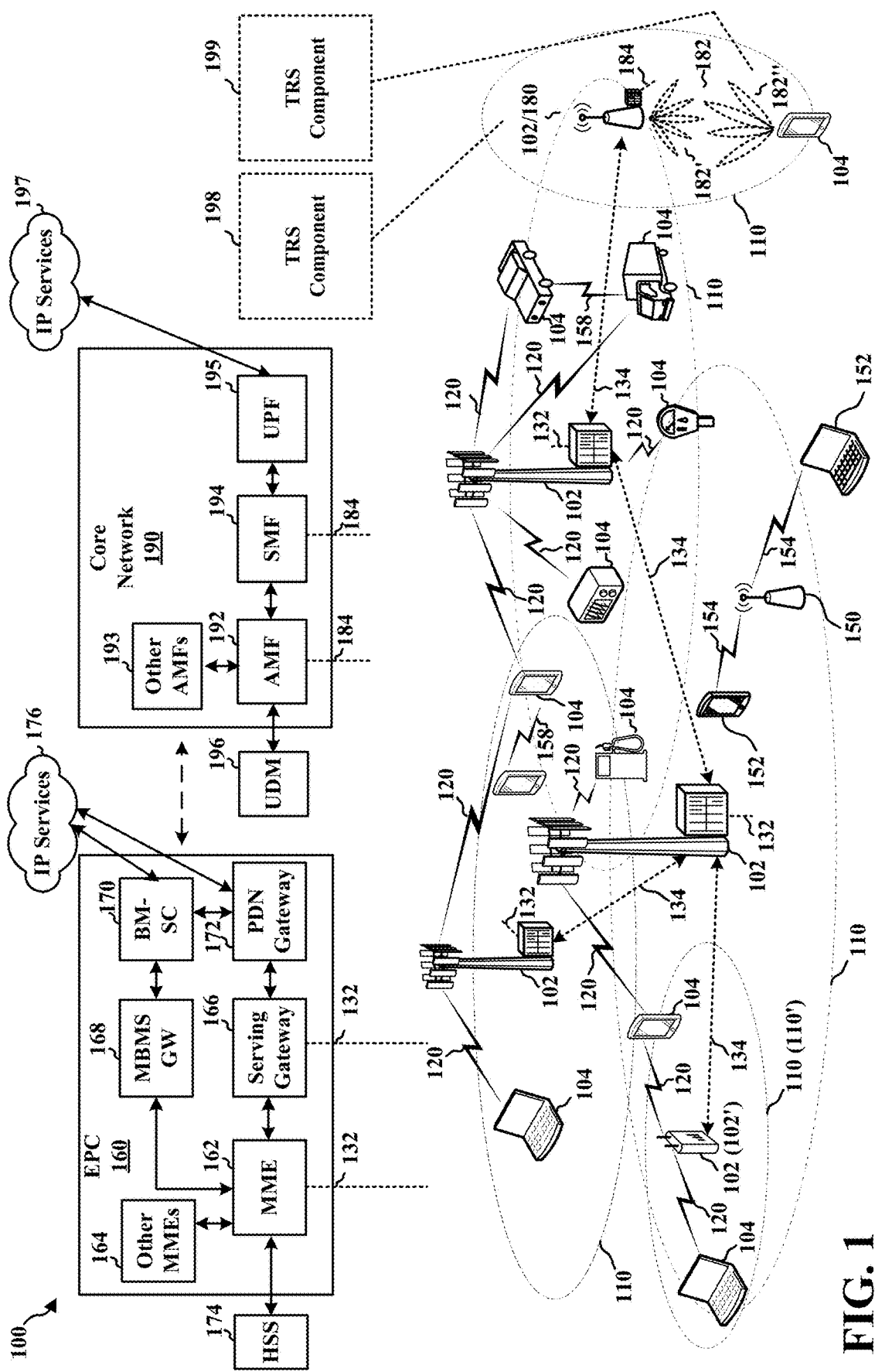
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Various aspects relate generally to broadcast/multicast communications, such as transmitting/receiving a tracking reference signal (TRS) to enable a user equipment (UE) that is in an idle and/or inactive mode to synchronize and/or track one or more base stations. Some aspects more specifically relate to a base station transmitting a broadcast/multicast service in a multicast broadcast single frequency network (MBSFN) area multicast communication. Some aspects may also relate to the base station transmitting a TRS for a broadcast/multicast service for a target MBSFN cell to a UE that is connected to the base station.

Particular aspects of the subject matter described in this disclosure can be implemented to realize one or more of the following potential advantages. In some examples, the described techniques can be used to enable a UE to more effectively receive a TRS for MBSFN communication, more efficiently perform synchronization with one or more base stations, and/or more efficiently track one or more base stations such that the UE can receive MBSFN.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells. Base station 102 may be referred to herein as a "cell" which may include one or more of macrocells, small cells, femtocells, picocells, and microcells without departing from the scope of the present disclosure.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 180 may include a TRS component 198 configured to determine a broadcast/multicast service to be provided to a UE in a MBSFN area, and further configured to transmit a TRS to the UE, the TRS indicating information associated with receiving the broadcast/multicast service by the UE. Similarly, in some aspects, the UE 104 may include a TRS component 199 configured to receive a TRS from a base station associated with a MBSFN area providing a broadcast/multicast service for the UE, and further configured to receive the broadcast/multicast service based on the TRS.

Although the following description may be focused on 5G NR, the concepts described herein may be applicable to other similar areas, such as LTE, LTE-A, CDMA, GSM, and other current or future wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and $2^\mu$ slots/subframe. The subcarrier spacing and symbol length/duration are a function of the numerology. The subcarrier spacing may be equal to $2^\mu *15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
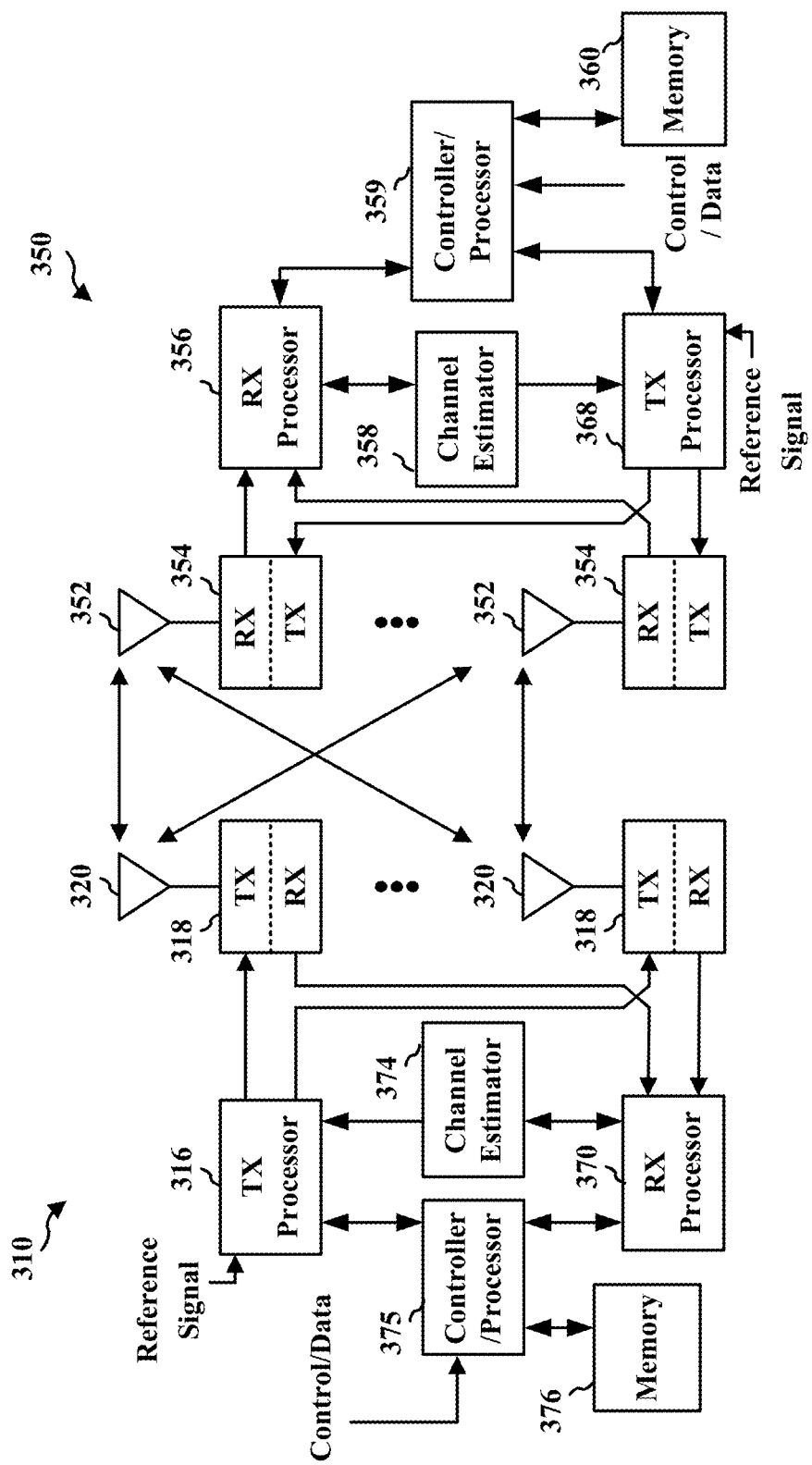
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

Figure 4:
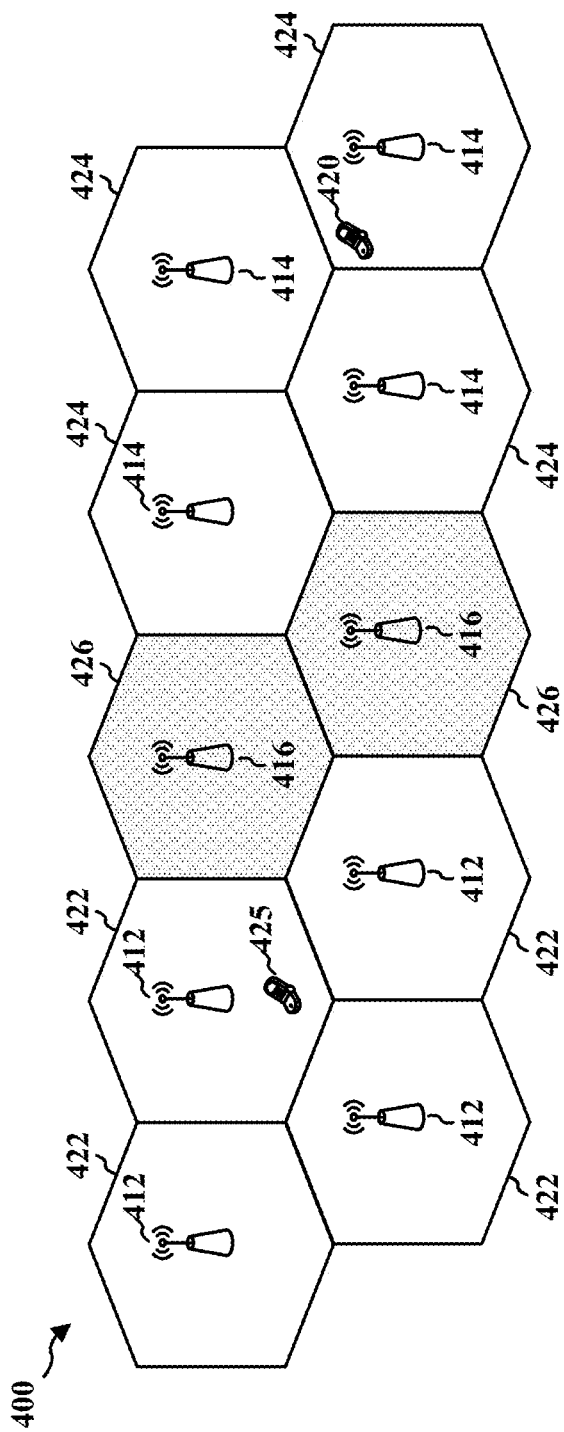
FIG. 4 is a diagram illustrating an example of a multicast broadcast single frequency network (MBSFN).

FIG. 4 is a diagram illustrating an example 400 of MBSFN areas in an access network. The base stations 412 and 416 in cells 422 and 426 may form a first MBSFN area and the base stations 414 and 416 in cells 424 and 426 may form a second MBSFN area. The base stations 412, 414, and 416 may each be associated with other MBSFN areas. For example, the base stations 416 are associated with both the first MBSFN area and the second MBSFN area. In some aspects, a base station may be associated with up to a total of eight MBSFN areas. A cell within an MBSFN area may be designated a reserved cell. Reserved cells may not provide multicast/broadcast content, but may be time-synchronized to the cells 422, 424, and 426 associated with an MBSFN area, and may have restricted power on MBSFN resources in order to limit interference to the MBSFN areas.

Different MBSFN areas may have different carrier frequencies. If two nearby/adjacent MBSFN areas have the same carrier frequency, the MBSFN subframes or radio frames for the cells in the two MBSFN areas may be time division multiplexed. The time division multiplexing of subframes or radio frames for MBSFN transmissions may help to avoid interference between different MBSFN areas. Each base station in an MBSFN area synchronously may transmit the same control information and/or data, e.g., for an MBSFN service provided thereby. Each area may support broadcast, multicast, and unicast services. A unicast service is a service intended for a specific UE, for example, a voice call. A multicast service is a service that may be received by a group of UE within an MBSFN area, for example, a subscription video service. A broadcast service is a service that may be received by all UEs within an MBSFN area, for example, a news broadcast. The first MBSFN area may support a first multicast/broadcast service (for example, an evolved multicast/broadcast service), such as by providing a particular news broadcast to UE 425. The second MBSFN area may support a second multicast/broadcast service, such as by providing a different news broadcast to UE 420.

Figure 5:
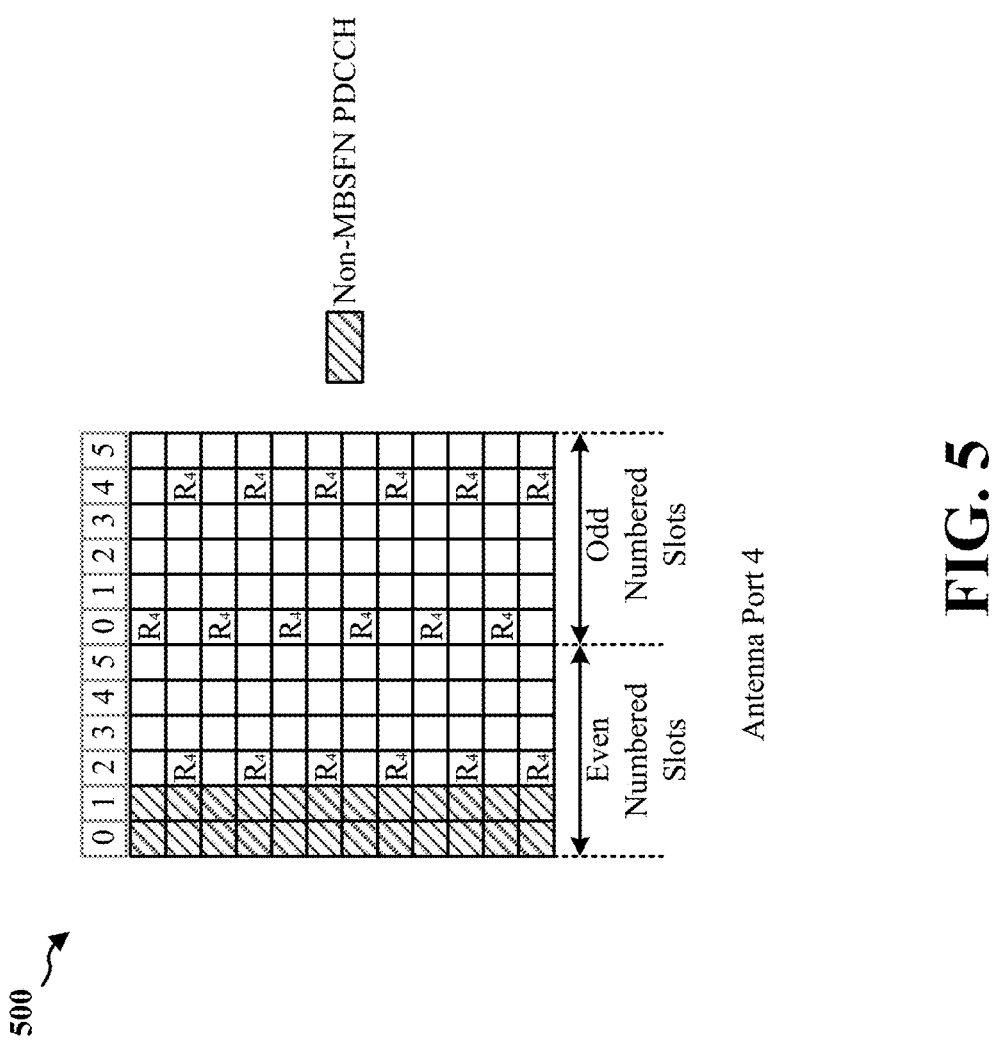
FIG. 5 is a diagram illustrating an MBSFN subframe.

FIG. 5 is a diagram illustrating a MBSFN subframe 500. The base stations 412, 414, and 416 may communicate using MBSFN subframes. The MBSFN subframes may include multicast control channels (MCCH) and multicast traffic channels (MTCH). In MBSFN subframes, symbols may be reserved for PDCCH (such as a non-MBSFN PDCCH). For example, the first one or two symbols of a given MBSFN subframe may be for PDCCH. The MBSFN subframes may also include MBSFN reference signals (MBSFN RS). The MBSFN RS may be denser than cell specific reference signals. The MBSFN RS may be on antenna port 4, and the cell specific reference signal may be on antenna ports 0-3. The MBSFN RS may be defined for wideband and extended cyclic prefix, and may not be defined for non-wideband or normal cyclic prefix communications.

In some communication standards, such as 5G NR, a base station may utilize a TRS to communicate with a UE. The UE may use the TRS to perform one or more of time synchronization or frequency synchronization with the MBSFN area, or to perform other tracking in order to receive communication in the MBSFN area.

The base station may transmit a RRC message to a connected UE (e.g., a UE operating in an RRC state of RRC_CONNECTED). The RRC message may contain configuration information for the TRS. The UE may receive the RRC message and may store the TRS configuration information. The UE may perform some action causing phase discontinuity, such as performing BWP switching, BWP activation, carrier aggregation, cell activation (e.g., secondary cell activation), multi-TRP switching, multi-panel switching, or beam changing, where the UE requires to the TRS for fast synchronization and fine time/frequency tracking.

The UE may be configured to operate in one of at least three RRC states. For example, a UE may operate in an RRC_CONNECTED mode, e.g., in which the UE is currently connected to the wireless network (e.g., in both the control and user planes) through the base station. That is, a UE in an RRC_CONNECTED mode may have an access stratum (AS) context stored in the RAN, the UE may belong to a specific cell, the UE may communicate unicast data, and the RAN may control mobility of the UE. In the RRC INACTIVE mode, the UE may have an RRC context established with the base station or core network connection are established, but no data transfer is possible from the UE; however, the UE may be able to receive paging initiated by the RAN and broadcast of system information. In the RRC_IDLE state, where RRC context and base station or core network connections are not established, so no data transfer is possible from the UE; however, the UE may still be able to receive broadcast of system information.

In some aspects, a base station sends a TRS to the UE when the UE is in the RRC_IDLE and/or the RRC_INACTIVE states. The TRS configuration information received by the UE 425 in the RRC message may indicate the resources on which the base station will send the TRS such that the resources on which the UE receives the TRS are specified to the UE. In NR, there is no cell-specific RS (CRS). The TRS may be specifically configured for the UE for time/frequency tracking. For example, the TRS may be configured as a CSI-RS resource set with single-port non-zero power CSI-RS. The TRS may be a periodic TRS, may be a semi-persistent TRS, or may be an aperiodic TRS. Where the TRS is periodic, the TRS configuration information may identify the resources where it will be periodically transmitted. Where the TRS is semi-persistent, the TRS may be activated and deactivated by a medium access control-control element (MAC-CE) and the TRS configuration information may identify the resources where the TRS will be transmitted when the TRS is activated, or may identify a resource position relative to the resources carrying the MAC-CE where the TRS will be transmitted. Where the TRS is aperiodic, the TRS may be triggered by the DCI for UL grant. The triggering UL grant may indicate one of a set of slot offset values, and the TRS configuration information may identify a set of slot offset values, where the slot offset is the number of slots between the slot transmitting TRS and the slot carrying the UL DCI.

The UE may receive the TRS and may compare the resources on which the TRS is received to the expected resources to perform time and frequency synchronization and tracking.

In some wireless systems, such as NR, broadcast/multicast transmissions may occupy or have different multicast areas, and may employ different single frequency network (SFN) cell IDs, bandwidth parts (BWPs), quasi-co-located (QCL) beams and/or different uplink/downlink beams. In an aspect of the present disclosure, the TRS may be employed in multicast systems to provide IDLE/INACTIVE UEs with BWP switching and/or activation. Some TRS, such as persistent TRS and/or semi-persistent TRS, may be configured by system information blocks (SIB) and/or MCCH, and semi-persistent TRS may be activated by MAC-CE. In an aspect of the present disclosure, a large periodicity may be used to reduce the overhead, which may be a multiple of the MCCH periodicity.

In an aspect of the present disclosure, The TRS may include information that is associated with receiving the broadcast/multicast service that is based on an RRC state of the UE. For example, the information associated with the broadcast/multicast service may comprise a BWP on which the broadcast/multicast service is to be received by the UE when the UE is operating in an RRC Idle state or an RRC Inactive state, and/or at least one of a BWP or a serving cell on which the broadcast/multicast service is to be received by the UE when the UE is operating in an RRC Connected state. In an aspect of the present disclosure, the at least one of the BWP or the serving cell is configured to provide continuity of the broadcast/multicast service to be received by the UE when the UE is operating in the RRC Connected state.

In an aspect of the present disclosure, the TRS may be an aperiodic TRS, where the aperiodic TRS may be triggered by a group DL DCI for a BWP. A multicast data transmission may also be employed for faster tracking by the UE. An aperiodic TRS can be used for MCCH, where a group DL DCI with MCCH-RNTI is employed.

An aperiodic TRS can also be used for MTCH, where a group DL DCI with G-RNTI may be employed for MTCH with a higher MCS.

An aperiodic TRS may also be transmitted by the base station before an instantaneous multicast data transmission. The DL DCI may indicate the TRS slot offset (including a zero offset) relative to the slot carrying the DCI.

In an aspect of the present disclosure, the TRS can be transmitted in wireless communications systems, such as NR systems, in a multicast transmission to UEs that are RRC_CONNECTED, for BWP and/or cell switching/activation when the RRC_CONNECTED UE is moving to a different multicast area, such that the RRC_CONNECTED UE may maintain service continuity during mobility. In an aspect of the present disclosure, the source base station can provide signaling for the TRS at a target base station. A periodic, semi-persistent, and/or aperiodic TRS configuration may be transmitted by the base station through RRC signaling in a multicast transmission in the target base station.

In an aspect of the present disclosure, DL DCI with C-RNTI may be transmitted by the base station trigger an aperiodic TRS at a target base station before the multicast transmission. The source base station may also be the base station transmitting multicast transmissions, and/or the source base station may be the serving cell for unicast retransmissions. For aperiodic TRS transmissions, the slot offset between DCI at the source base station and the TRS at the target base station may be larger than the slot offset for a legacy unicast PDCCH and the aperiodic TRS of the same base station. In such an aspect of the present disclosure, a set of slot offset values for the DCI at the source base station to trigger a TRS at the target base station may configured by RRC independent from that of a legacy unicast slot offset for the aperiodic TRS. In an aspect of the present disclosure, an additional delta offset for inter-cell/inter-BWP scheduling for multicast transmissions may be configured by RRC signaling and/or otherwise defined. A Total slot offset may be determined by adding the delta offset to a legacy slot offset indicated by DCI.

Figure 6:
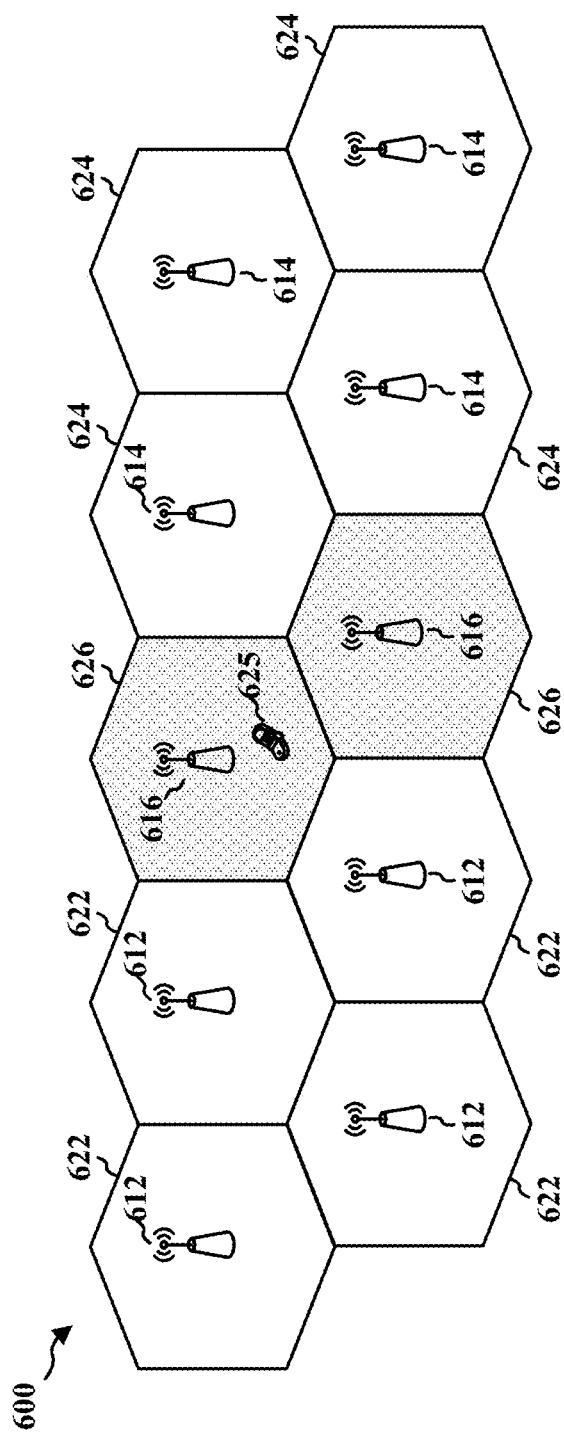
FIG. 6 is a diagram illustrating an example of a UE within multiple MBSFN areas in an access network, in accordance with some aspects of the present disclosure.

FIG. 6 is a diagram illustrating an example 600 of a UE 625 within multiple MBSFN areas in an access network. Base stations 612 in cells 622 and base stations 616 in cells 626 may form a first MBSFN area for a first MBSFN, and base stations 614 in cells 624 and base station 616 in cells 626 may form a second MBSFN area for a second MBSFN. The base stations 616 may be in both the first and the second MBSFN and the cells 626 may be in both the first and second MBSFN areas. The UE 625, located in one of the cells 626, is in both the first and the second MBSFN areas, and will receive MBSFN broadcasts from both the first MBSFN and the second MBSFN.

Figure 7:
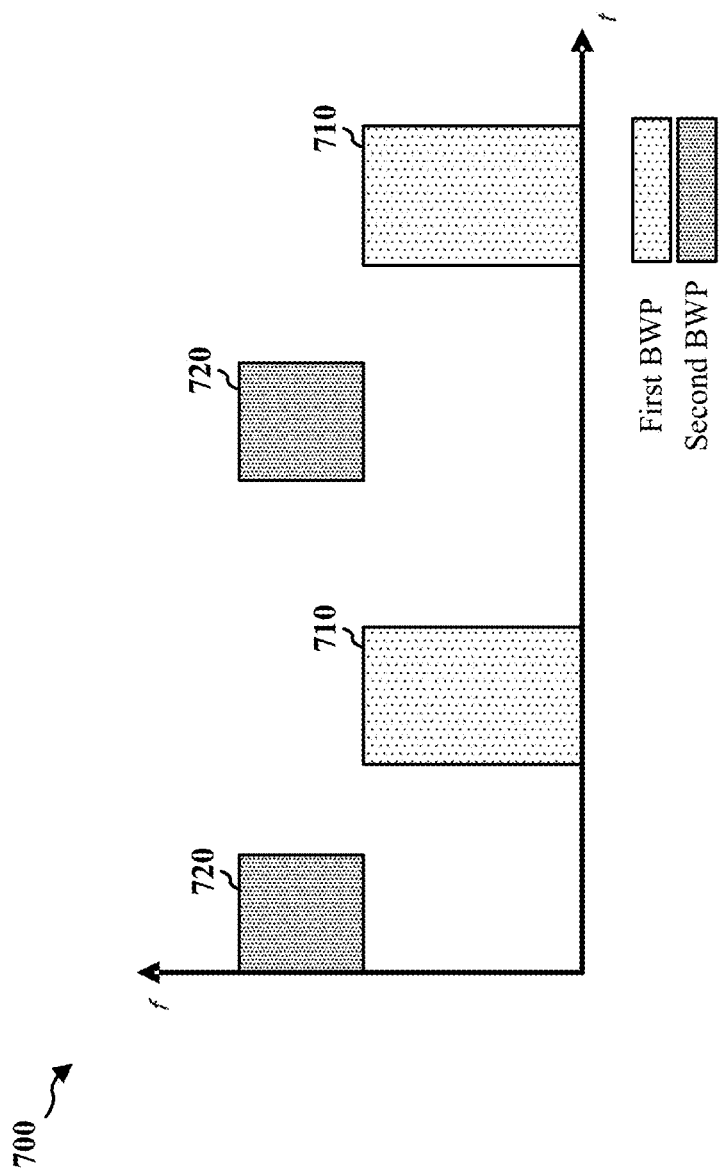
FIG. 7 is a diagram illustrating bandwidth parts (BWPs) for communications on multiple MBSFNs, in accordance with some aspects of the present disclosure.

FIG. 7 is a diagram illustrating bandwidth parts 700 for communications on multiple MBSFNs. For example, FIG. 7 may illustrate BWPs used for MBSFN transmissions by the first MBSFN and the second MBSFN discussed with respect to FIG. 6. The first MBSFN may transmit MBSFN transmissions on the first BWP 710 and the second MBSFN may transmit MBSFN transmissions on the second BWP 720.

The first BWP 710 and the second BWP 720 include separate carrier frequencies for transmissions sent in the BWPs. The first BWP 710 and the second BWP 720 may also include different numerologies. In some aspects, the first BWP 710 may utilize one subcarrier spacing (e.g., 60 kHz) and the second BWP 720 may utilize a different subcarrier spacing (for example, 15 kHz). In some aspects, the first BWP 710 may utilize an extended cyclic prefix (ECP) and the second BWP 720 may utilize a normal cyclic prefix (NCP). For example, the first MBSFN may have a larger coverage area than the second MBSFN, so the first BWP 710 may utilize the ECP for MBSFN transmissions through the first MBSFN, while the second BWP 720 may utilize the NCP for MBSFN transmissions through the second MBSFN. The first BWP 710 and the second BWP 720 may also have different SFN cell IDs, QCL, and beams.

Referring again to FIG. 6, as UE 625 receives MBSFN transmissions from the first MBSFN on the first BWP 710 and receives MBSFN transmissions from the second MBSFN on the second BWP 720, the serving base station 616 may utilize TRS for the MBSFN communications with the UE 625 to synchronize its timing and frequencies with the respective BWPs with corresponding TRS.

Figure 8:
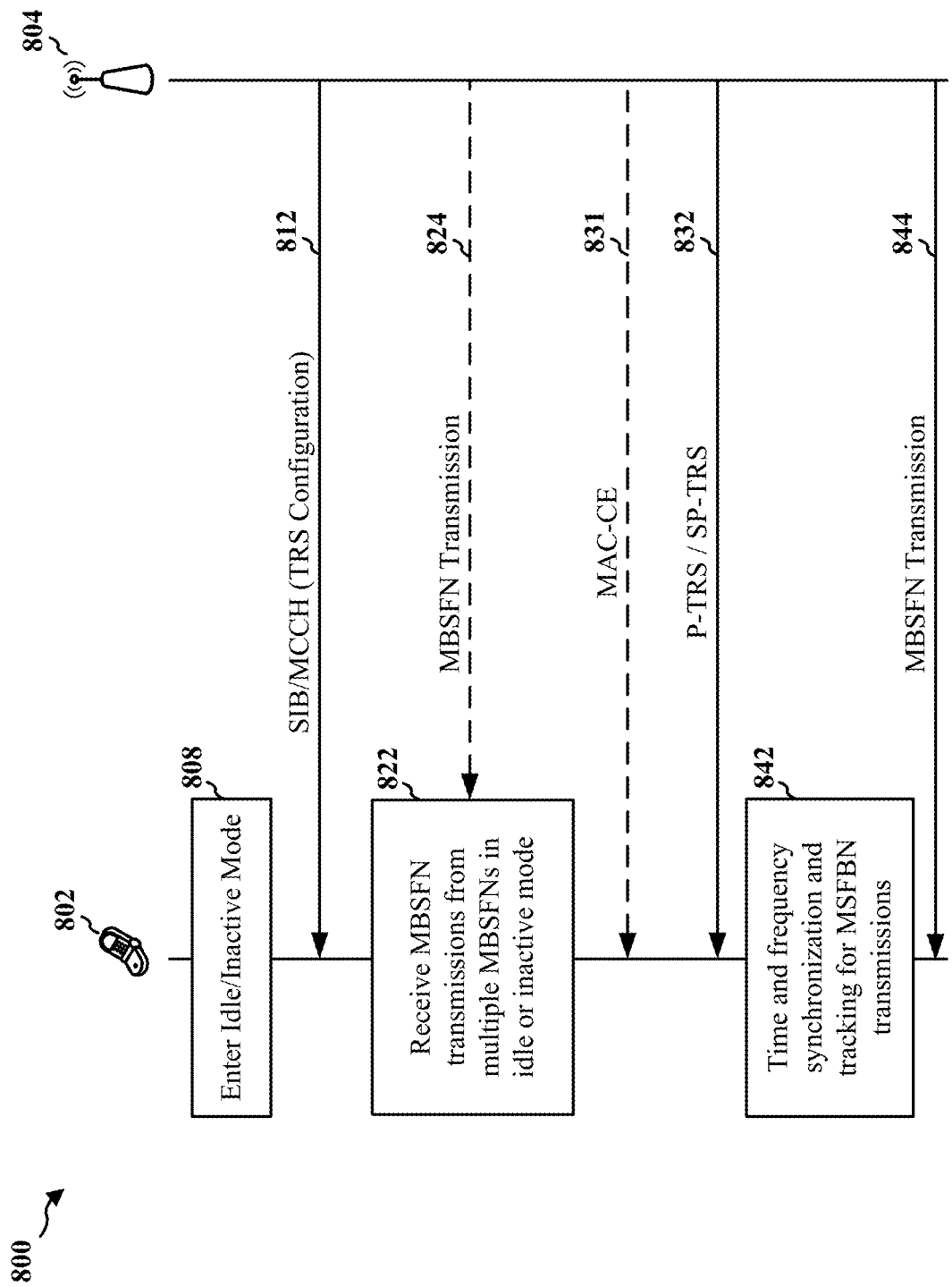
FIG. 8 is a communication diagram illustrating a process of utilizing a periodic or semi-persistent tracking reference signal (TRS) to transmit an MBSFN subframe to a UE, in accordance with some aspects of the present disclosure.

FIG. 8 is a communication diagram illustrating a process 800 of a base station 804 (for example, the base station 616) utilizing periodic or semi-persistent TRS to transmit an MBSFN subframe to a UE 802 (for example, the UE 625). The UE 802 and the base station 804 may both be part of a first MBSFN. The UE 802 may be part of a second MBSFN, and the base station 804 may or may not be part of the second MBSFN. The UE 802 may switch between BWPs to receive MBSFN transmissions from both the first and the second MBSFN.

The UE 802 may enter an idle or inactive mode, as illustrated at 808. The UE 802 may remain in the idle or inactive mode throughout the communication illustrated in FIG. 8, as the UE 802 may receive MBSFN transmissions while in an idle or inactive mode (that is, the UE 802 does not be in a connected mode with a base station to receive a MBSFN transmission from the base station).

The base station 804 may transmit a SIB or a MCCH 812 and the UE 802 may receive the SIB or the MCCH 812, and may do so while in idle or inactive mode. The SIB or MCCH may include TRS configuration information, and the UE 802 may receive the TRS configuration information. As illustrated at 822, the UE 802 may be in idle or inactive mode and may receive MBSFN transmissions from multiple MBSFNs in idle or inactive mode. For example, the UE 802 may receive one or more MBSFN transmission 824 from the base station 804.

In some aspects, where the base station 804 utilizes a semi-persistent TRS, the base station 804 may send a MAC-CE 831 to the UE 802. The MAC-CE may activate the semi-persistent TRS. While the semi-persistent TRS is active, the base station 804 may send the TRS to the UE 802. The semi-persistent TRS may remain active until the base station 804 transmits another MAC-CE to the UE 802 to deactivate the UE 802.

The base station 804 may transmit a TRS 832 to the UE 802. The TRS 832 may be a periodic TRS or a semi-persistent TRS in an active state. The base station 804 may transmit the TRS 832 on resources identified by the TRS configuration information, and the UE 802 may expect to receive the TRS 832 on the resources indicated by the TRS configuration information. In some aspects, the periodic or active semi-persistent TRS 832 may be sent with a large periodicity to reduce the overhead of the TRS 832. For example, the periodic or active semi-persistent TRS 832 may be sent once per MCCH, or may be sent once every X MCCH, where X is a positive integer. That is, the periodicity of the TRS 832 may be X times the periodicity of the MCCH.

The UE 802 may, as illustrated at 842, perform time or frequency synchronization or tracking for the MBSFN transmissions such as MBSFN transmission 844 based on the TRS. For example, the UE 802 may compare the resources on which the TRS was received to the expected resources. In some aspects, the UE 802 may perform the time and frequency synchronization and tracking for the MCCH. In some aspects, the UE 802 may perform the time and frequency synchronization and tracking for the MTCH.

Figure 9:
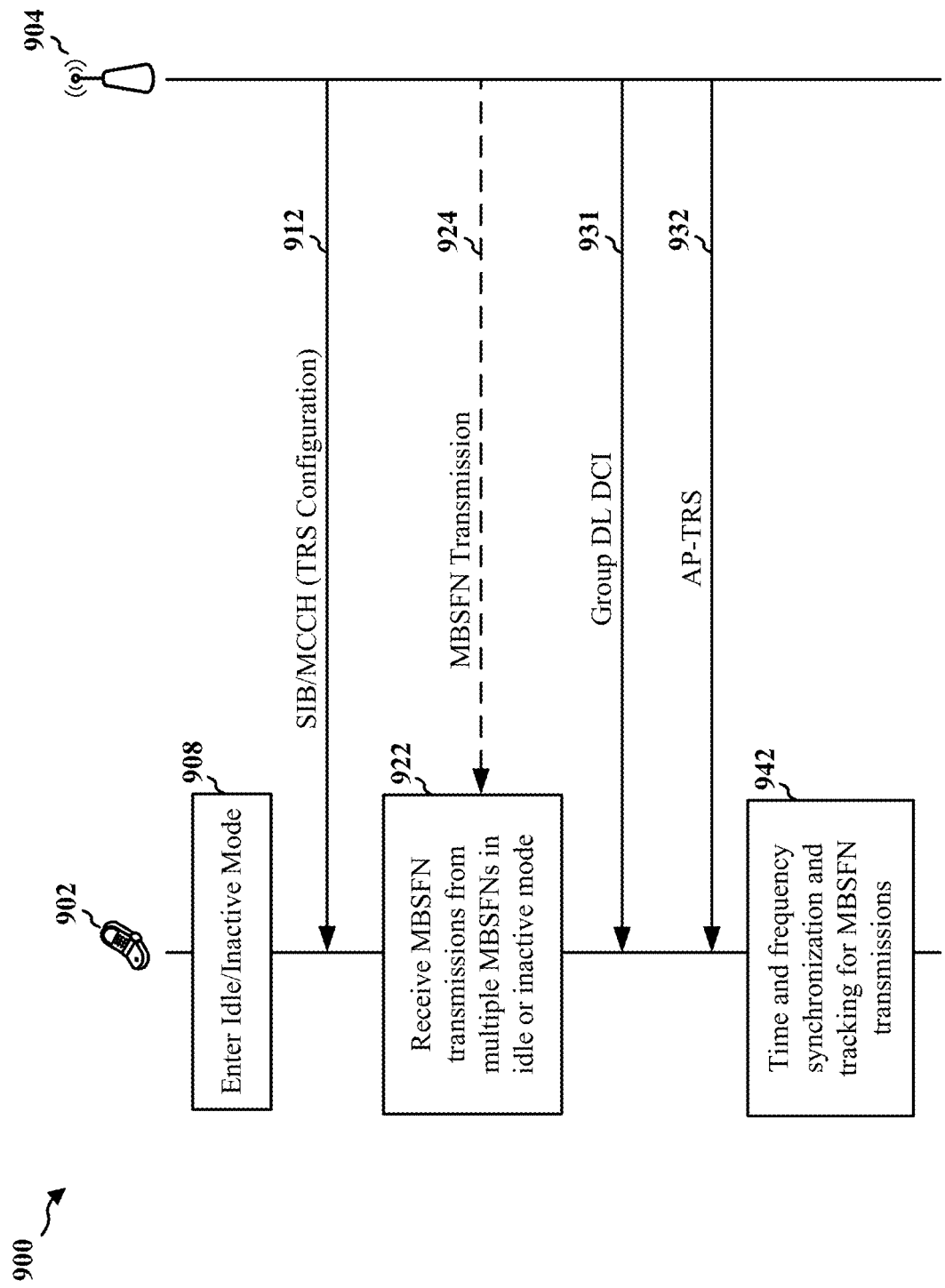
FIG. 9 is a communication diagram illustrating a process of utilizing an aperiodic TRS to transmit an MBSFN subframe to a UE, in accordance with some aspects of the present disclosure.

FIG. 9 is a communication diagram illustrating a process 900 of utilizing aperiodic TRS to transmit a MBSFN subframe to a UE 902 (for example, the UE 625). The UE 902 and a base station 904 (such as the base station 616) may both be part of a first MBSFN. The UE 902 may be part of a second MBSFN, and the base station 904 may or may not be part of the second MBSFN. The UE 902 may switch between BWPs to receive MBSFN transmissions from both the first and the second MBSFN.

The UE 902 may enter an idle or inactive mode, as illustrated at 908. The UE 902 may remain in the idle or inactive mode throughout the communication illustrated in FIG. 9, as the UE 902 may receive MBSFN transmissions while in an idle or inactive mode (that is, the UE 902 does not be in a connected mode with a base station to receive a MBSFN transmission from the base station).

The base station 904 may transmit a SIB or a MCCH 912 containing TRS configuration information, and the UE 902 may receive the SIB or MCCH 912 and the TRS configuration information (for example, while in idle or inactive mode), for example as described above with respect to the SIB/MCCH 812 of FIG. 8. As illustrated at 922, the UE may be in idle or inactive mode and may receive MBSFN transmissions from multiple MBSFNs while in idle or inactive mode, such as one or more MBSFN transmission 924 from the base station 904.

The base station 904 may transmit group DL DCI 931 to the UE 902. The group DL DCI 931 may be DCI for a MBSFN sent to each UE receiving the MBSFN transmission. The group DL DCI 931 may trigger the aperiodic TRS. The TRS configuration information may include an offset, such as a slot offset or a subframe offset, indicating how many slots of subframes after the group DL DCI 931 the TRS will come. The base station 904 may indicate to the UE 902 which slot or subframe will contain the aperiodic TRS 932 by transmitting the DL DCI 931 in a slot or subframe before the aperiodic TRS 932 and transmitting the aperiodic TRS 932 after the offset. The UE 902, having received the offset in the SIB or MCCH 912, knows when to look for the aperiodic TRS 932 upon receiving the DL DCI 931.

After being triggered by the group DL DCI 931, the base station 904 transmits an aperiodic TRS 932 to the UE 902. The base station 904 may transmit the aperiodic TRS 932 on resources based on an offset contained in the group DL DCI 931 and on the TRS configuration information. For example, the offset may determine the slot or subframe and the TRS configuration information may determine the resources within the slot or subframe which the base station 904 will transmit the aperiodic TRS on.

The UE 902 may, as illustrated at 1142, perform time or frequency synchronization or tracking for the MSFBN transmissions based on the aperiodic TRS. For example, the UE 902 may compare the resources on which the TRS was received to the expected resources. In some aspects, the group DL DCI 931 may include a MCCH-radio network temporary identifier (MCCH-RNTI) to schedule the PDSCH carrying the MCCH, and the UE 902 can use the aperiodic TRS to frequency or time synchronize the MCCH. In some aspects, the group DL DCI 931 may include a group RNTI to schedule the PDSCH carrying the MTCH, and UE 902 can use the aperiodic TRS to frequency or time synchronize the MTCH.

Figure 10:
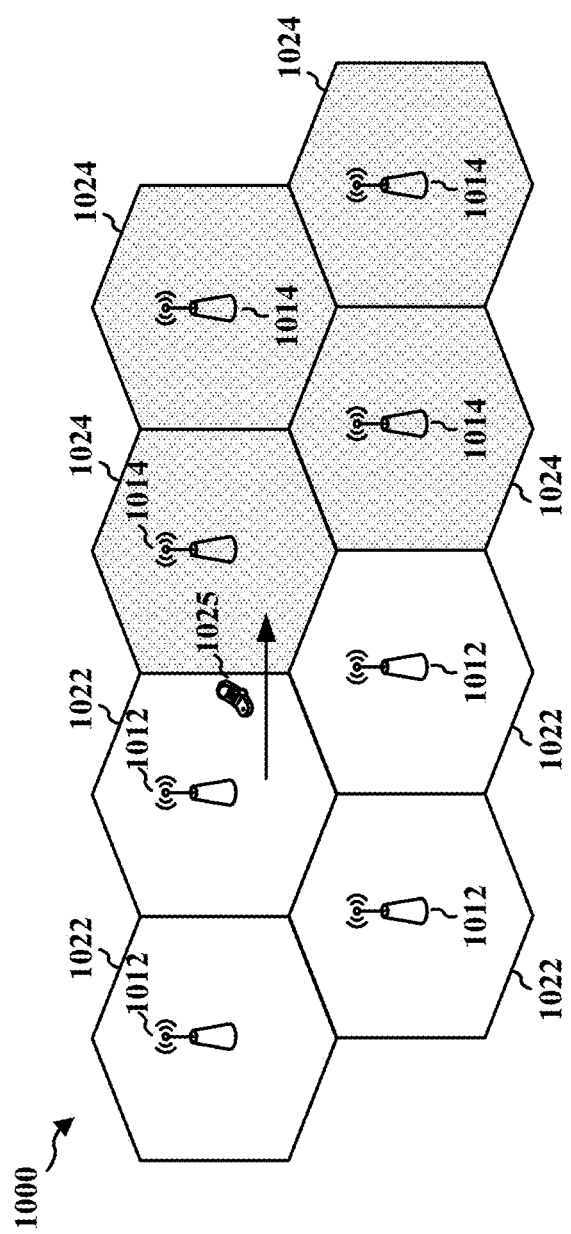
FIG. 10 is a diagram illustrating an example of a UE moving into an MBSFN area in an access network, in accordance with some aspects of the present disclosure.

FIG. 10 is a diagram illustrating an example 1000 of a UE 1025 moving into an MBSFN area in an access network. Base stations 1012 in cells 1022 may form a first MBSFN area for a first MBSFN, and base stations 1014 in cells 1024 may form a second MBSFN area for a second MBSFN. The UE 1025 may be in a connected state with one or more base station 1012 of the first MBSFN. The base station 1012 currently serving the connected UE 1025 may attempt to handoff the connection to the UE 1025 to a target base station 1014 within the second MBSFN. For example, the UE 1025 may be moving geographically, and may be entering or may have entered the second MBSFN area (or may be leaving the first MBSFN area). Similarly, a UE may move from a unicast cell to a cell of an MBSFN area. Alternatively, a UE may move from a cell of an MBSFN area to a cell of unicast transmission, and may send TRS due to the different BWP switching, cell switching, beam switching, etc. between the two cells.

The first MBSFN and the second MBSFN may utilize first and second BWP with separate carrier frequencies, numerologies, SFN cell IDS, QCL, and beams, such as discussed above with respect to FIG. 7. As the UE 1025 is transferring from a base station 1012 in the first MBFSN utilizing the first BWP to a base station 1014 in the second MBSFN utilizing the second BWP, the target base station 1014 which will become the next serving base station may utilize TRS for communications with the UE 1025 to determine the BWP or other synchronization or tracking information of the second MBSFN in order to receive MBSFN communication from the second MBSFN.

Figure 11:
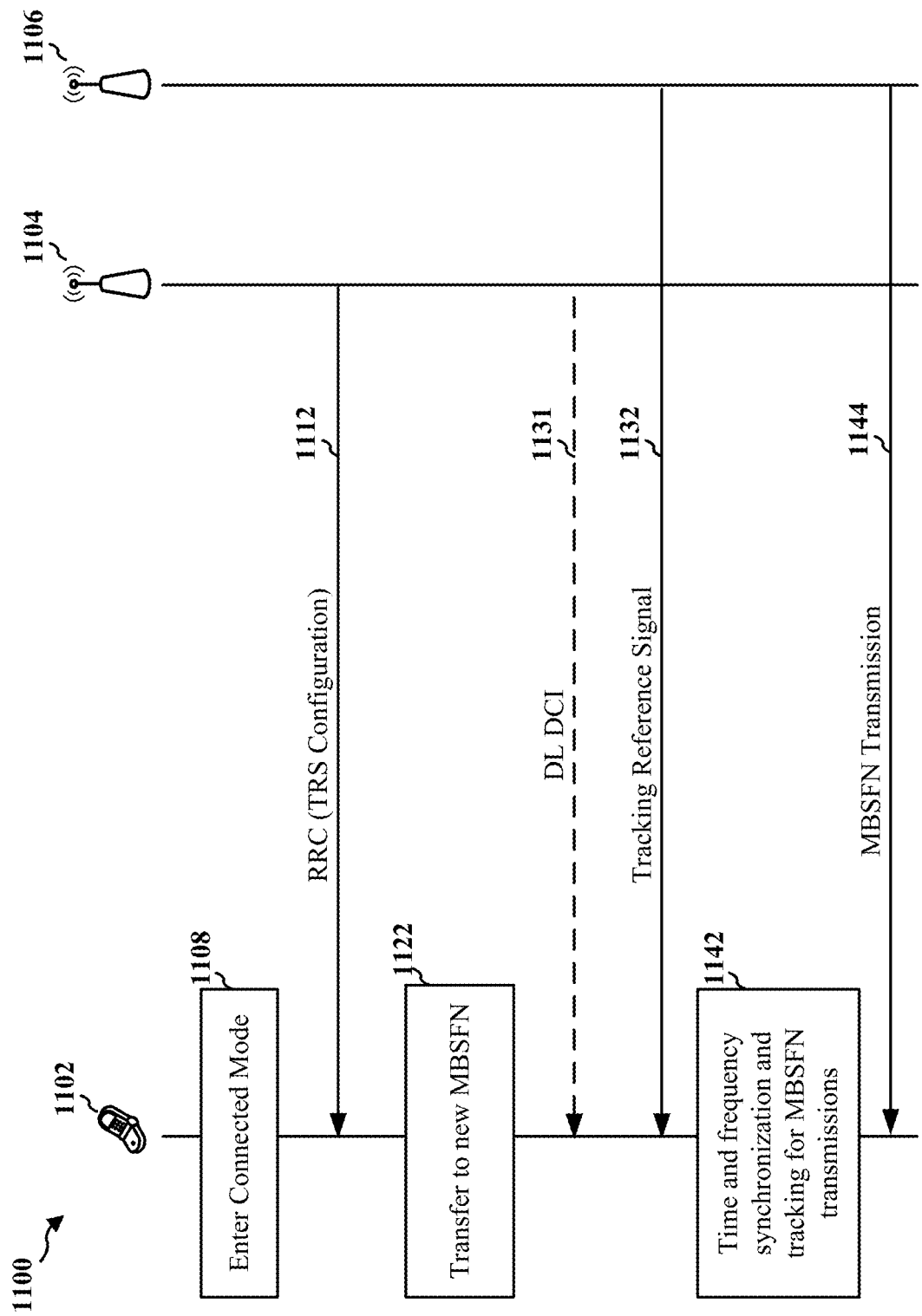
FIG. 11 is a communication diagram illustrating a process of utilizing a TRS to transmit an MBSFN subframe to a UE, in accordance with some aspects of the present disclosure.

FIG. 11 is a communication diagram illustrating a process 1100 of utilizing a TRS to transmit an MBSFN subframe to a UE 1102. The UE 1102 may enter a connected mode with the source base station 1104, as illustrated at 1108, such that the source base station 1104 serves the UE 1102. The UE 1102 may remain in the connected mode throughout the communication illustrated in FIG. 11. The source base station 1104 may be in a first MBSFN, and the UE 1102 may be connected to the first MBSFN when served by the source base station 1104.

The source base station 1104 may transmit an RRC message 1112 to the UE 1102. The RRC message 1112 may include TRS configuration information for one or more other base station, such as target base station 1106, and may also include TRS configuration information for one or more than one BWP in the target base station for broadcast/multicast. In some aspects, the TRS configuration information may include a set of slot offset values. The UE 1102 receives the RRC message 1112, including the TRS configuration for the target base station 1106, from the source base station 1104.

The UE 1102 may transfer its connection to a new MBSFN, such as a second MBSFN including the target base station 1106. The UE 1102 may be moving geographically, and may be entering or may have entered a second MBSFN area served by the target base station 1106 (or may be leaving a first MBSFN area served by the source base station 1104). The source base station 1104 may handoff the connection with the UE 1102 to the target base station 1106.

The target base station 1106 transmits a TRS 1132 to the UE 1102. The TRS 1132 may be a periodic TRS, a semi-persistent TRS, or an aperiodic TRS. As illustrated at 1142, the UE may utilize the TRS 1132 to perform time or frequency synchronization or tracking for MBSFN transmissions 1144 from the target base station 1106, and may do so based on the TRS configuration received from the serving base station 1104.

In some aspects, where the TRS 1132 is an aperiodic TRS, the serving base station 1104 transmits DL DCI 1131 to the UE 1102. The DL DCI 1131 may include a cell-RNTI (C-RNTI) specific to the UE 1102. The DL DCI 1131 may trigger the aperiodic TRS 1132 in the target base station 1106 before the target base station transmits a MBSFN transmission 1144 to the UE 1102. In some aspects, the DL DCI 1131 may include an indication selecting a slot offset of the set of slot offsets in the TRS configuration information to use for the triggered TRS. In response to being triggered by the DL DCI 1131, the target base station 1106 may transmit the aperiodic TRS 1132.

Where the TRS 1132 is an aperiodic TRS, an offset included in the TRS configuration information may indicate that the TRS 1132 will arrive from the target base station 1106 a certain number of slots or subframes after the DL DCI 1131 is received from the source base station 1104. In some aspects, the RRC message 1112 may include a first offset for aperiodic TRS from a first base station triggered by a second base station, and may include a second offset for aperiodic TRS in unicast PDCCH and aperiodic TRS triggered for use within the same base station. The first offset may be larger than the second offset. In some aspects, the RRC message 1112 may indicate a configuration of a delta offset, or the delta offset may be set or preconfigured, and the delta offset may be added to the second offset for aperiodic TRS in unicast PDCCH and aperiodic TRS triggered for use within the same base station when the aperiodic TRS is triggered inter-base station. The second base station may be in the same MBSFN or a different MBSFN.

Although the source base station 1104 is described herein as belonging to a first MBSFN, in some aspects, the source base station 1104 may be a unicast base station and may not be a part of a MBSFN.

In some aspects, the DL DCI-triggered aperiodic TRS described above with respect to FIG. 11 is not limited to use with UEs transferring into base stations multicasting over different BWPs. In some aspects, the source base station 1104 and the target base station 1106 may be base stations such as unicast base stations operating on different BWPs. In some aspects, the source base station 1104 and the target base station 1106 may be the same base station providing multiple (different) BWPs and/or carriers (e.g., for carrier aggregation). In some aspects, the DL DCI-triggered aperiodic TRS described above with respect to FIG. 11 is used for initial and retransmission over different BWPs in the same base station or in different base stations.

In some aspects, the base station 1104 may transmit the TRS 1132 based on the frequency band being tracked. For example, the base station 1104 may transmit the TRS 1132 if tracking a first frequency band (such as FR1) and may transmit a separate tracking signal if tracking a second frequency band (such as FR2). The separate tracking signal may be similar to a SSB. This "similar" SSB may be referred to as a separate SSB, a virtual SSB, an effective SSB, a second SSB, a pseudo SSB, a similar SSB, and/or a simulated SSB herein. The second SSB may be a SSB that is not on the sync raster. The second SSB may be a periodic, bursty synchronization reference signal. The second SSB may be quasi-co-located with the TRS using the same cell ID and/or a pseudo cell ID. The base station 1104 may transmit a configuration for the second SSB to the UE 1102. In some aspects, the second SSB may be configured for an the initial synchronization of the UE 1102 and a new raster may be configured for NR broadcast or multicast.

Figure 12:
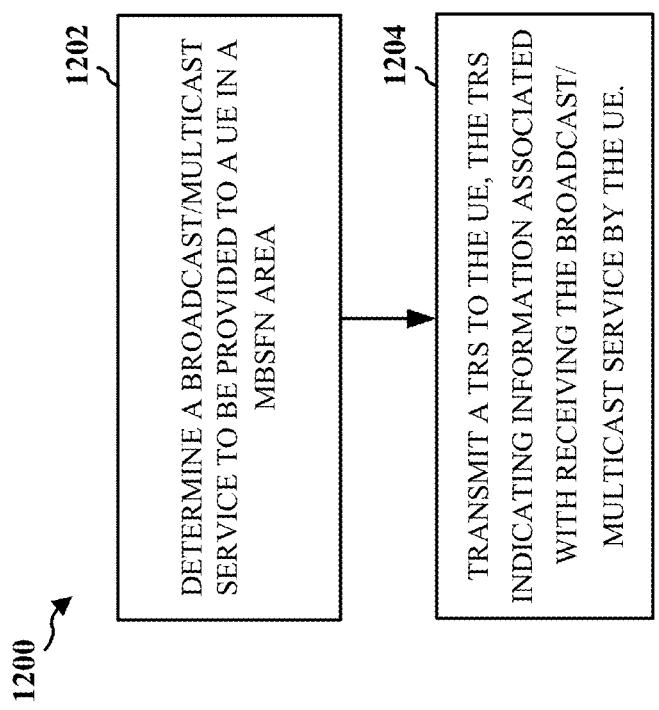
FIG. 12 is a flowchart illustrating a method of wireless communication that supports transmitting an MBSFN subframe and a TRS to an idle UE, in accordance with some aspects of the present disclosure.

FIG. 12 is a flowchart 1200 of a method of wireless communication. The method may be performed by a base station (such as the base station 804, 904, 1104; the apparatus 1802; the processing system 1514, which may include the memory 376 and which may be the entire base station 310 or a component of the base station 310, such as the TX processor 316, the RX processor 370, or the controller/processor 375).

At 1202, the base station determines a broadcast/multicast service to be provided to a UE in a MBSFN area. For example, 1202 may be performed by the MBSFN communication component 1406.

At 1204, the base station transmits a TRS to the UE, the TRS indicating information associated with receiving the broadcast/multicast service by the UE. For example, 1204 may be performed by the TRS component 1408.

In some aspects, the TRS may include a periodic TRS, and the base station may configure periodic TRS parameters in system information or a MCCH. The TRS may be transmitted using a periodicity that is an integer multiple of an MCCH periodicity.

In some aspects, the TRS may include a semi-persistent TRS, and the base station may configure semi-persistent TRS parameters in system information or a MCCH and activate the semi-persistent TRS using a MAC-CE.

The TRS may be transmitted using a periodicity that is an integer multiple of an MCCH periodicity.

In some aspects, the TRS may include an aperiodic TRS, and the base station may configure aperiodic TRS parameters in system information or a MCCH and may trigger the aperiodic TRS based on a DL DCI for a data transmission. The aperiodic TRS with parameters configured in the system information may be associated with the MCCH, and the DL DCI may use a multicast control channel radio network temporary identifier (MCCH-RNTI). The aperiodic TRS with parameters configured in the MCCH may be associated with a multicast traffic channel (MTCH) and the DL DCI may use a group radio network temporary identifier (G-RNTI) for the MTCH. The aperiodic TRS may be transmitted no later than the data transmission of the MTCH. The DL DCI may indicate a slot offset for the aperiodic TRS relative to a slot carrying the DL DCI. The DL DCI that triggers the aperiodic TRS may schedule a multicast data transmission on a different bandwidth part.

In some aspects, the base station may configure a second SSB for the broadcast/multicast service, and may transmit the SSB on a raster that is different than a synchronization raster. The second SSB may include a semi-persistent SSB. The second SSB may be transmitted in periodic bursts. The second SSB may be quasi-co-located with the TRS using a same cell identifier and/or pseudo cell identifier.

Figure 13:
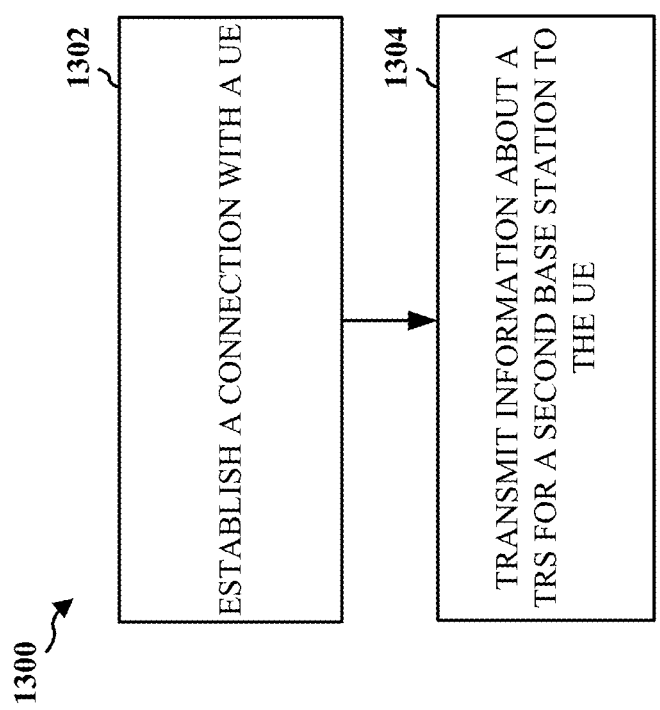
FIG. 13 is a flowchart illustrating a method of wireless communication that supports transmitting configuration information for a TRS transmitted by another base station, in accordance with some aspects of the present disclosure.

FIG. 13 is a flowchart 1300 of a method of wireless communication. The method may be performed by a base station (such as the base station 804, 904, 1104; the apparatus 1802; the processing system 1514, which may include the memory 376 and which may be the entire base station 310 or a component of the base station 310, such as the TX processor 316, the RX processor 370, or the controller/processor 375).

At block 1302, which optionally may be in addition to one or more of block 1202 or block 1204 as described with respect to FIG. 12, the base station establishes a connection with a UE. For example, 1302 may be performed by the UE connection component 1414.

At block 1304, which optionally may be in addition to one or more of block 1202 or block 1204 as described with respect to FIG. 12, the base station transmits information about a TRS for a second cell to the UE. For example, 1304 may be performed by the second base station TRS configuration component 1412. The first cell may include a source cell serving the UE and the second cell may include a target cell. The information may include a configuration for the TRS from the second cell and may be signaled in RRC signaling from the first cell. The information may include DCI with a C-RNTI from the first cell that triggers an aperiodic TRS at the second cell before a downlink multicast transmission.

The TRS may include an aperiodic TRS, and the information may indicate at least one slot offset from the DL DCI for the TRS from the second cell that is different than a slot offset for the first cell. The TRS may include an aperiodic TRS, and the information may indicate an additional inter-cell slot offset from the DL DCI for the TRS from the second cell. The TRS may include an aperiodic TRS, and the DL DCI that triggers the aperiodic TRS may schedule a multicast data transmission on a different bandwidth part. The TRS may include an aperiodic TRS, and the DL DCI that triggers the aperiodic TRS may schedule a unicast data transmission on a different bandwidth part. The TRS may include an aperiodic TRS, and the DL DCI that triggers the aperiodic TRS may schedule an initial transmission on a different bandwidth part. The TRS may include an aperiodic TRS, and the DL DCI that triggers the aperiodic TRS may schedule a retransmission on a different bandwidth part.

In some aspects, the base station may transmit multicast communication from the first cell to the UE. In some aspects, the base station may transmit unicast communication from the first cell to the UE.

In some aspects, the base station may transmit a configuration for a second SSB for the second cell, in which the second SSB is on a raster that is different than a synchronization raster. The second SSB may include a semi-persistent SSB. The second SSB may be transmitted in periodic bursts. The second SSB may be quasi-co-located with the TRS using a same cell identifier and/or pseudo cell identifier.

Figure 14:
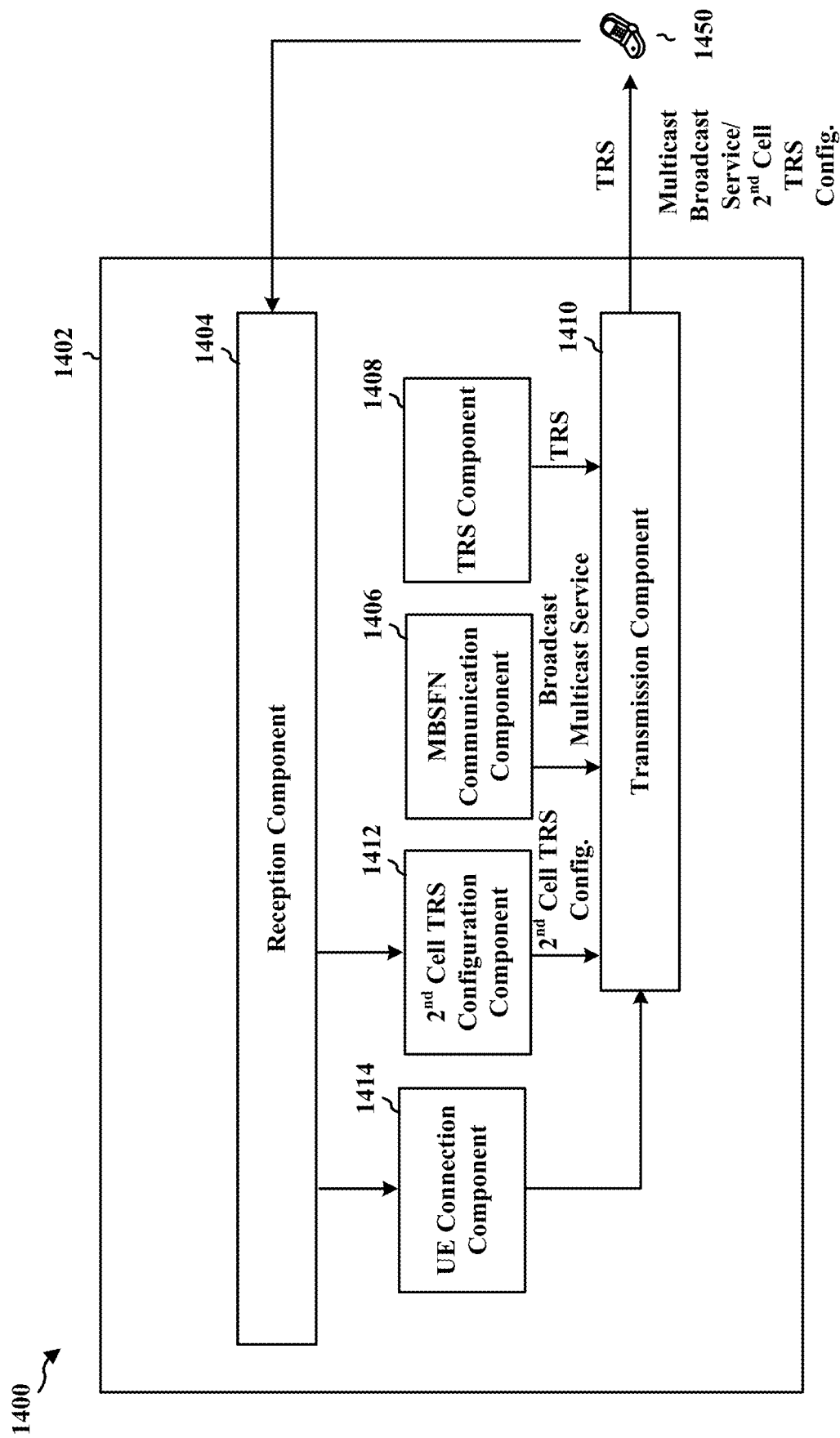
FIG. 14 is a conceptual flow diagram illustrating the data flow between different components in an example base station, in accordance with some aspects of the present disclosure.

FIG. 14 is a conceptual data flow diagram 1400 illustrating the data flow between different means/components in an example apparatus 1402. The apparatus may be a base station. The apparatus includes a MBSFN communication component 1406 that transmits a broadcast/multicast service to a UE 1450, such as described in connection with 1202. The apparatus also includes a TRS component 1408 that transmits a TRS to the UE 1450 while the UE 1450 is inactive, such as described in connection with 1204. The MBSFN communication component 1406 and the TRS component 1408 may utilize a transmission component 1410 to transmit to the UE 1450.

The apparatus includes a UE connection component 1414 to establish a connection with the UE 1450, such as described in connection with 1302. The UE connection component 1414 may utilize the transmission component 1410 or a reception component 1404 to establish the connection with the UE 1450. The apparatus further includes a second base station TRS configuration component 1412 that transmits second cell TRS configuration information, or TRS configuration information for a TRS transmitted by a cell other than the apparatus 1402, to the UE 1450, such as described in connection with 1304. The second cell TRS configuration component may utilize the transmission component 1410 to transmit the second base station TRS configuration information to the UE 1450. The second base station may be in the same MBSFN or a different MBSFN as the first base station.

The apparatus may include additional components that perform each of the blocks of the algorithm in the aforementioned flowcharts of FIGS. 12 and 13. As such, each block in the aforementioned flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
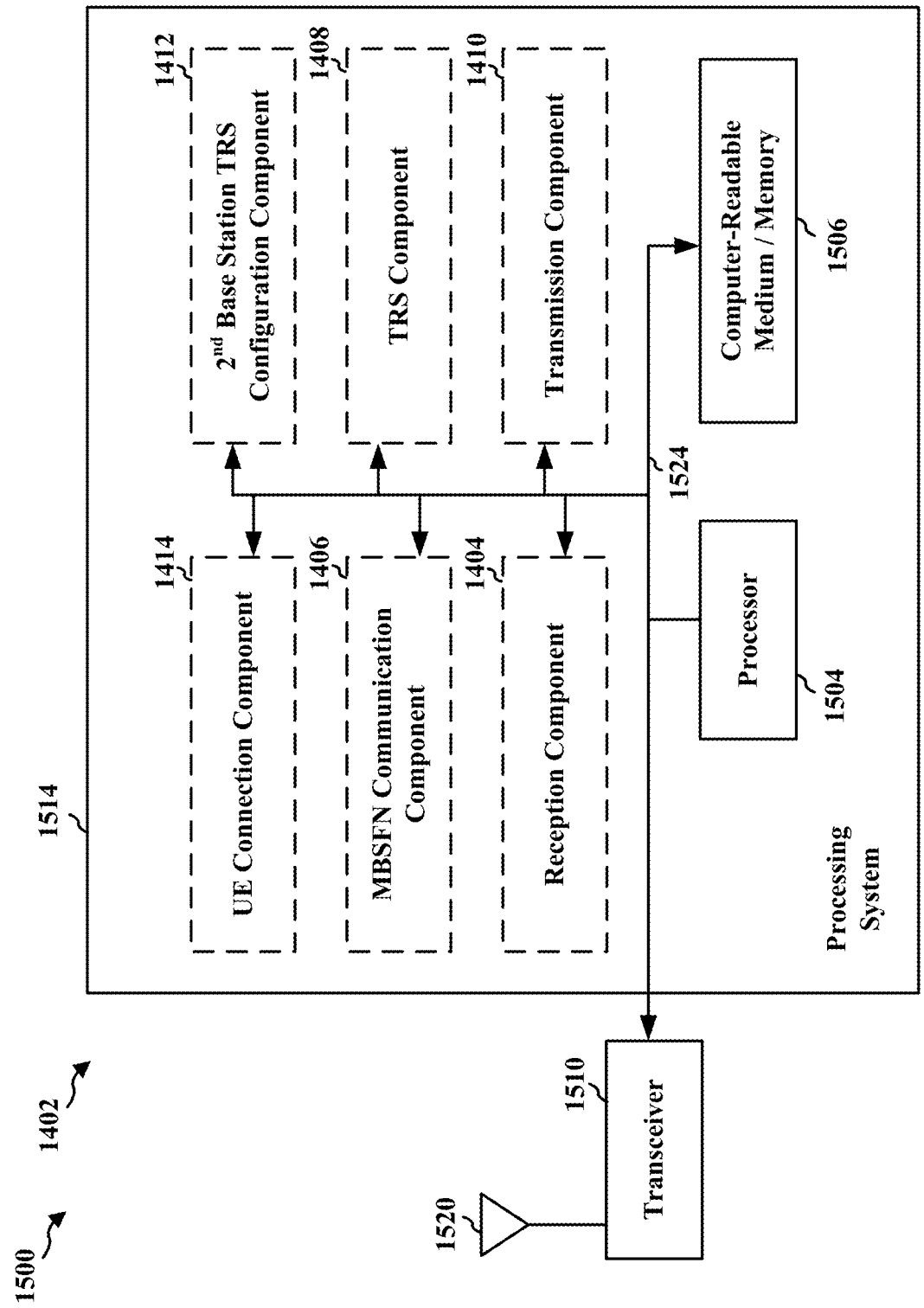
FIG. 15 is a diagram illustrating an example of a hardware implementation for an apparatus employing a processing system, in accordance with some aspects of the present disclosure.

FIG. 15 is a diagram 1500 illustrating an example of a hardware implementation for an apparatus 1402 employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors or hardware components, represented by the processor 1504, the components 1406, 1408, 1412, 1414, and the computer-readable medium/memory 1506. The bus 1524 may also link various other circuits such as timing sources, peripherals, voltage regulators, and power management circuits.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described herein for any particular apparatus. The computer-readable medium/memory 1506 may also be used for storing data that is manipulated by the processor 1504 when executing software. The processing system 1514 further includes at least one of the components 1406, 1408, 1412, 1414. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 or at least one of the TX processor 316, the RX processor 370, and the controller/processor 375. Alternatively, the processing system 1514 may be the entire base station (such as 310 of FIG. 3).

In one configuration, the apparatus 1402 for wireless communication includes means for transmitting a broadcast/ multicast service in a MBSFN multicast communication and means for transmitting a TRS for the broadcast/multicast service to one or more idle or inactive UE. The apparatus 1402 also includes means for establishing a connection with a UE and means for transmitting information about a TRS for a second cell to the UE. In some aspects, the apparatus 1402 includes means for configuring periodic TRS parameters in system information or a MCCH. In some aspects, the apparatus 1402 includes means for configuring semi-persistent TRS parameters in system information or a MCCH and means for activating the semi-persistent TRS using a MAC-CE. In some aspects, the apparatus 1402 includes means for. In some aspects, the apparatus 1402 includes means for configuring aperiodic TRS parameters in system information or a MCCH and means for triggering the aperiodic TRS based on a DL DCI for a data transmission. In some aspects, the apparatus 1402 includes means for configuring a second SSB for the broadcast/multicast service and means for transmitting the SSB on a raster that is different than a synchronization raster. The aforementioned means may be one or more of the aforementioned components of the apparatus 1402 or the processing system 1514 of the apparatus 1402 configured to perform the functions recited by the aforementioned means. As described herein, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
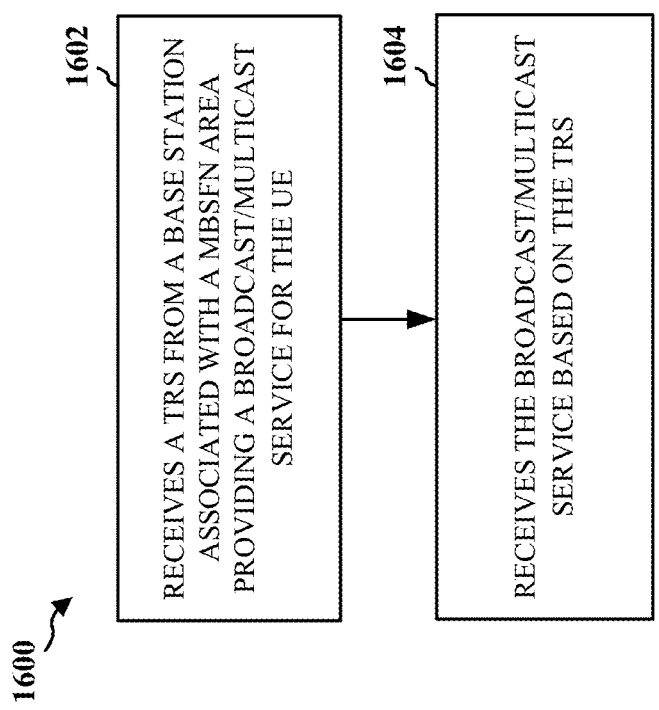
FIG. 16 is a flowchart illustrating a method of wireless communication that supports receiving an MBSFN subframe and a TRS at an idle UE, in accordance with some aspects of the present disclosure.

FIG. 16 is a flowchart 1600 of a method of wireless communication. The method may be performed by a UE (such as the UE 802, 902, 1102; the apparatus 1802; the processing system 1914, which may include the memory 360 and which may be the entire UE 350 or a component of the UE 350, such as the TX processor 368, the RX processor 356, or the controller/processor 359).

At block 1602, the UE receives a TRS from a base station associated with a MBSFN area providing a broadcast/multicast service for the UE. For example, 1602 may be performed by the TRS component 1808.

At block 1604, the UE receives the broadcast/multicast service based on the TRS. For example, 1604 may be performed by the MBSFN Communication Component 1806.

In some aspects, the TRS includes a periodic TRS, and the UE may receive a configuration for periodic TRS parameters in system information or a MCCH. The TRS may be received using a periodicity that is an integer multiple of an MCCH periodicity.

In some aspects, the TRS may include a semi-persistent TRS, and the UE may receive a configuration for semi-persistent TRS parameters in system information or a MCCH, and receive activation of the semi-persistent TRS using a MAC-CE. The TRS may be transmitted using a periodicity that is an integer multiple of an MCCH periodicity.

In some aspects, the UE may receive a configuration for aperiodic TRS parameters in system information or a MCCH, and may receive the triggering of the aperiodic TRS based on DCI for a data transmission. The aperiodic TRS with parameters configured in the system information may be associated with the MCCH, and the DL DCI may use a MCCH-RNTI. The aperiodic TRS with parameters configured in the MCCH may be associated with a MTCH and the DL DCI may use a G-RNTI for the MTCH. The aperiodic TRS may be received no later than the data transmission.

The DL DCI may indicate a slot offset for the aperiodic TRS relative to a slot carrying the DL DCI. The DL DCI that triggers the aperiodic TRS may schedule a multicast data transmission on a different bandwidth part.

In some aspects, the UE may receive a configuration for a second SSB for the broadcast/multicast service, and may receive the SSB on a raster that is different than a synchronization raster. The second SSB may include a semi-persistent SSB. The second SSB may be received in periodic bursts. The second SSB may be quasi-co-located with the TRS using a same cell identifier and/or pseudo cell identifier.

Figure 17:
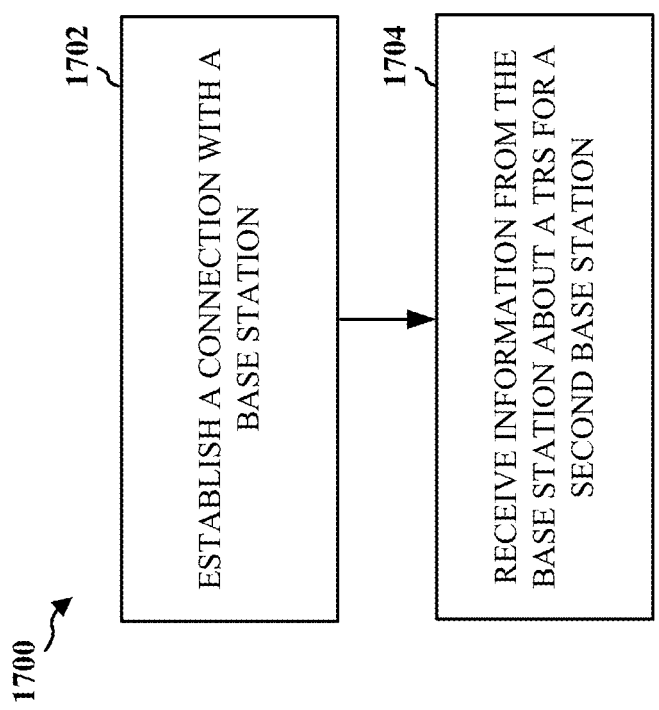
FIG. 17 is a flowchart illustrating a method of wireless communication that supports receiving configuration information from a base station for a TRS transmitted by another base station, in accordance with some aspects of the present disclosure.

FIG. 17 is a flowchart 1700 of a method of wireless communication. The method may be performed by a UE (such as the UE 802, 902, 1102; the apparatus 1802; the processing system 1914, which may include the memory 360 and which may be the entire UE 350 or a component of the UE 350, such as the TX processor 368, the RX processor 356, or the controller/processor 359).

At block 1702, which optionally may be in addition to one or more of block 1602 or block 1604 as described with respect to FIG. 16, the UE establishes a connection with a first cell. For example, 1702 may be performed by the cell connection component 1814. The base station may include a source base station or cell serving the UE and the second base station includes a target base station or cell in a different multicast area.

At block 1704, which optionally may be in addition to one or more of block 1602 or block 1604 as described with respect to FIG. 16, the UE receives information from the base station about a TRS for a second base station. For example, 1702 may be performed by the second base station TRS configuration component 1812. The information may include a configuration for the TRS of the second base station or cell and is signaled in RRC signaling from the base station. The information may include DCI with a C-RNTI from the base station that triggers an aperiodic TRS at the second cell before a downlink multicast transmission. The TRS may include an aperiodic TRS, and the information may indicate at least one slot offset from the DL DCI for the TRS from the second base station that is different than a slot offset for the first base station. The TRS may include an aperiodic TRS, and the information may indicate an additional intercell slot offset from the DL DCI for the TRS from the second base station. The second base station may be in the same MBSFN or a different MBSFN as the first base station.

In some aspects, the UE receives multicast communication from the first base station. In some aspects, the UE receives unicast communication from the first base station.

The TRS may include an aperiodic TRS, and the DL DCI that triggers the aperiodic TRS may schedule a multicast data transmission on a different bandwidth part. The TRS may include an aperiodic TRS, and the DL DCI that triggers the aperiodic TRS may schedule a unicast data transmission on a different bandwidth part. The TRS may include an aperiodic TRS, and the DL DCI that triggers the aperiodic TRS may schedule an initial transmission on a different bandwidth part. The TRS may include an aperiodic TRS, and the DL DCI that triggers the aperiodic TRS may schedule a retransmission on a different bandwidth part.

In some aspects, the UE receives a configuration for a second SSB for the second cell, in which the SSB is on a raster that is different than a synchronization raster. The second SSB may include a semi-persistent SSB. The second SSB may be received in periodic bursts. The second SSB may be quasi-co-located with the TRS using a same cell identifier and/or pseudo cell identifier.

Figure 18:
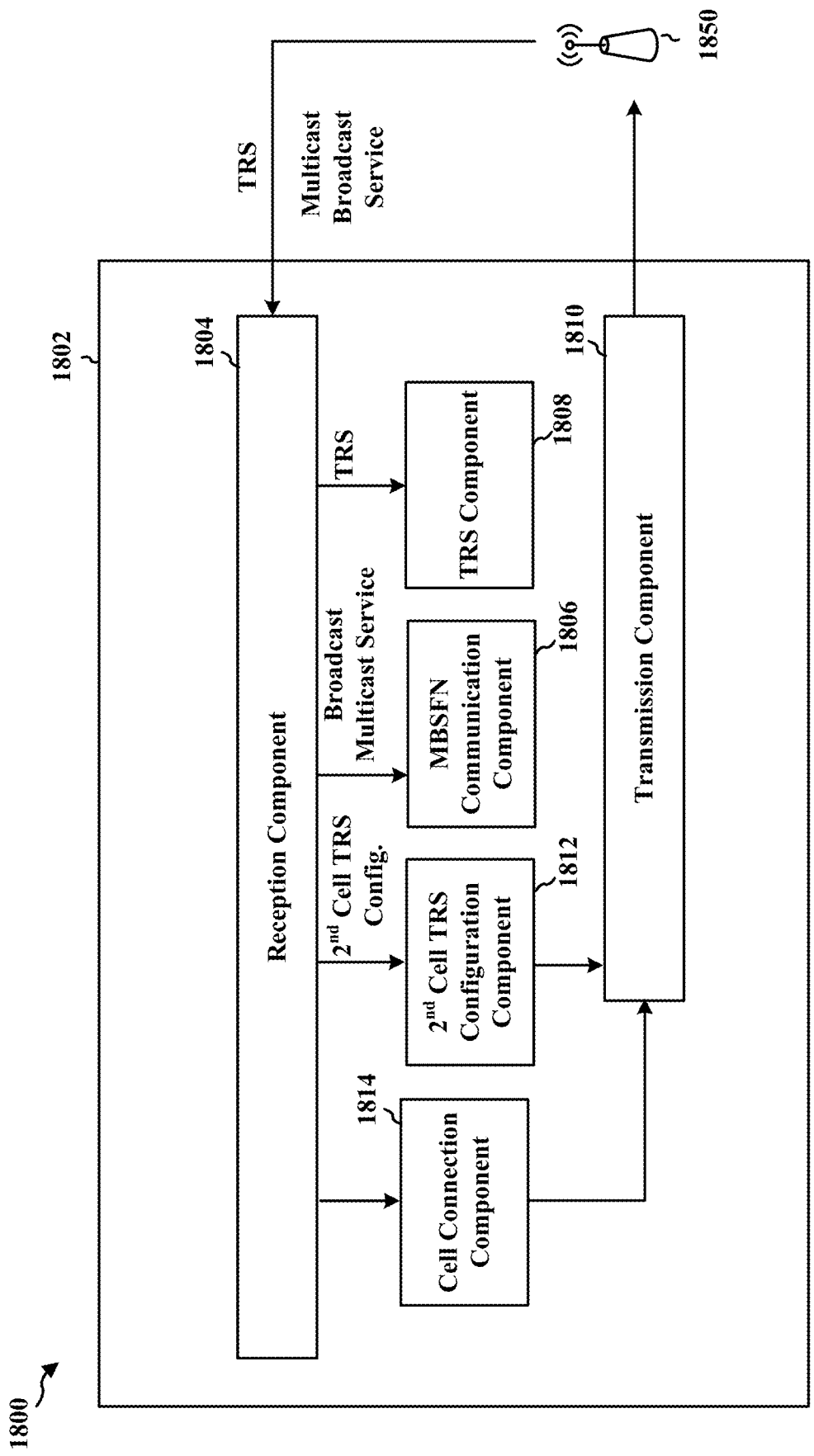
FIG. 18 is a conceptual flow diagram illustrating the data flow between different components in an example UE, in accordance with some aspects of the present disclosure.

FIG. 18 is a conceptual data flow diagram 1800 illustrating the data flow between different means/components in an example apparatus 1802. The apparatus may be a UE. The apparatus includes a TRS component 1808 that receives a TRS from a base station 1850 while the apparatus is in an idle or inactive state with the base station 1850, such as described in connection with 1602. The apparatus includes a MBSFN communication component 1806 that receives a broadcast/multicast service from the base station 1850 using the TRS, such as described in connection with 1604. The TRS component 1808 and the MBSFN communication component 1806 may utilize a reception component 1804 to receive from the base station 1850.

The apparatus further includes a cell connection component 1814 that establishes a connection with the base station 1850, such as described in connection with 1702. The cell connection component 1814 may utilize the reception component 1804 or the transmission component 1810 to establish the connection with the base station 1850. The apparatus includes a second base station TRS configuration component 1812 to receive second base station TRS configuration information, or TRS configuration information for a TRS transmitted by a base station other than base station 1850, from the base station 1850. The second base station TRS configuration component 1812 may utilize the reception component 1804 to receive the second base station TRS configuration. The second base station may be in the same MBSFN or a different MBSFN as the first base station.

The apparatus may include additional components that perform each of the blocks of the algorithm in the aforementioned flowcharts of FIGS. 16 and 17. As such, each block in the aforementioned flowcharts of FIGS. 16 and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
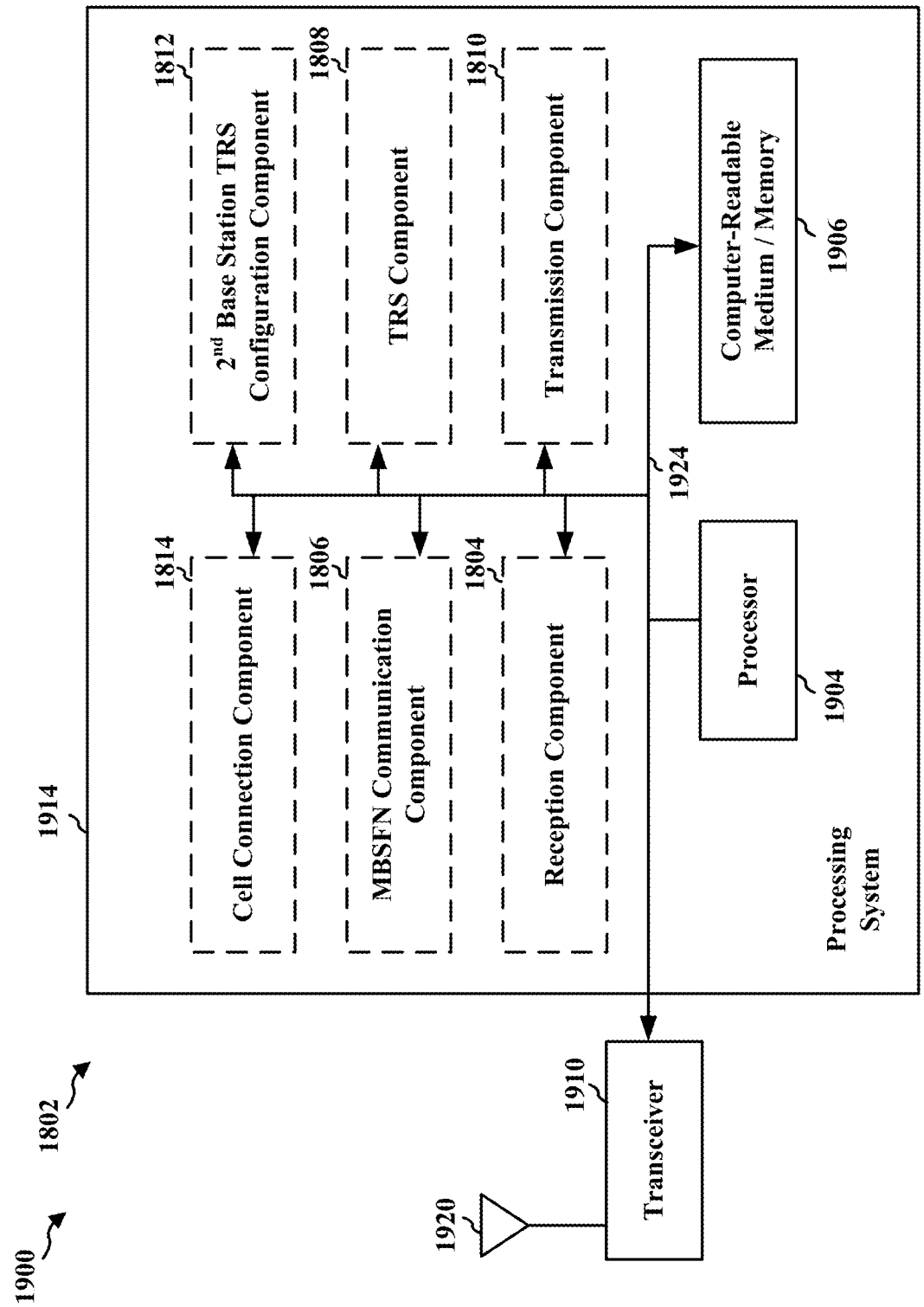
FIG. 19 is a diagram illustrating an example of a hardware implementation for an apparatus employing a processing system, in accordance with some aspects of the present disclosure.

FIG. 19 is a diagram 1900 illustrating an example of a hardware implementation for an apparatus 1802 employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors or hardware components, represented by the processor 1904, the components 1806, 1808, 1812, 1814, and the computer-readable medium/memory 1906. The bus 1924 may also link various other circuits such as timing sources, peripherals, voltage regulators, and power management circuits.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1810, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described herein for any particular apparatus. The computer-readable medium/memory 1906 may also be used for storing data that is manipulated by the processor 1904 when executing software. The processing system 1914 further includes at least one of the components 1806, 1808, 1812, 1814. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 or at least one of the TX processor 368, the RX processor 356, and the controller/processor 359. Alternatively, the processing system 1914 may be the entire UE (such as see 350 of FIG. 3).

In one configuration, the apparatus 1802 for wireless communication includes means for receiving a TRS for a broadcast/multicast service from a base station while in an idle or inactive state with the base station and means for receiving a broadcast/multicast service from the base station using the TRS. The apparatus also includes means for establishing a connection with a first base station and means for receiving information from the first base station about a TRS for a second cell. In some aspects, the apparatus includes means for receiving a configuration for periodic TRS parameters in system information or a MCCH. In some aspects, the apparatus includes means for receiving a configuration for semi-persistent TRS parameters in system information or a MCCH. In some aspects, the apparatus includes means for receiving activation of the semi-persistent TRS using a MAC-CE. In some aspects, the apparatus includes means for receiving a configuration for aperiodic TRS parameters in system information or a MCCH and means for receiving the triggering of the aperiodic TRS based on a DL DCI for a data transmission. The aforementioned means may be one or more of the aforementioned components of the apparatus 1802 or the processing system 1914 of the apparatus 1802 configured to perform the functions recited by the aforementioned means. As described herein, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, in which reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   determining a multicast/broadcast service to be provided to a user equipment (UE) in a multicast broadcast single frequency network (MBSFN) area; and
   transmitting, to the UE, a tracking reference signal (TRS) indicating information to maintain continuity of the multicast/broadcast service between different MBSFN areas during mobility of the UE, wherein the information is based on a radio resource control (RRC) state of the UE.

2. The method of claim 1, wherein the information indicates one or more of:
   a bandwidth part (BWP) on which the multicast/broadcast service is to be received by the UE when the UE is operating in an RRC Idle state or an RRC Inactive state, or
   at least one of a BWP or a serving cell on which the multicast/broadcast service is to be received by the UE when the UE is operating in an RRC Connected state.

3. The method of claim 2, wherein the information indicates which of the at least one of the BWP or the serving cell is used in the different MBSFN areas to maintain the continuity of the multicast/broadcast service between the different MBSFN areas when the UE is operating in the RRC Connected state.

4. The method of claim 1, wherein the TRS is a periodic TRS, the method further comprising:
   transmitting periodic TRS parameters in system information or a multicast control channel (MCCH).

5. The method of claim 4, wherein the TRS is transmitted using a periodicity that is an integer multiple of an MCCH periodicity.

6. The method of claim 1, wherein the TRS is a semi-persistent TRS, the method further comprising:
   transmitting, to the UE on a multicast control channel (MCCH), a set of parameters associated with the semi-persistent TRS; and
   transmitting, to the UE in a medium access control-control element (MAC-CE), information activating transmission of the semi-persistent TRS for the UE according to the set of parameters.

7. The method of claim 6, wherein the TRS is transmitted based on a periodicity that is an integer multiple of an MCCH periodicity.

8. The method of claim 1, wherein the TRS is an aperiodic TRS, the method further comprising:
   transmitting, to the UE, a set of parameters associated with the aperiodic TRS on a multicast control channel (MCCH) or via unicast RRC signaling; and
   transmitting, to the UE in downlink control information (DCI), information triggering the aperiodic TRS.

9. The method of claim 8, wherein the DCI includes a multicast control channel radio network temporary identifier (MCCH-RNTI), and the MCCH-RNTI indicates a schedule of the MCCH carried on a physical downlink shared channel (PDSCH).

10. The method of claim 8, wherein the DCI includes a group radio network temporary identifier (G-RNTI) to indicate a schedule for a multicast traffic channel (MTCH).

11. The method of claim 8, further comprising:
    transmitting, to the UE, the aperiodic TRS based on DCI including the information triggering the aperiodic TRS, wherein the aperiodic TRS indicates information configuring data communication associated with the multicast/broadcast service; and
    transmitting, after the aperiodic TRS, the data communication associated with the multicast/broadcast service.

12. The method of claim 8, wherein the DCI indicates a slot offset for the aperiodic TRS relative to a slot carrying the DCI.

13. The method of claim 8, wherein the DCI schedules a data communication associated with the multicast/broadcast service on a different BWP than a first BWP on which the data communication is currently scheduled.

14. The method of claim 1, further comprising:
    configuring a second synchronization signal block (SSB) for the multicast/broadcast service; and
    transmitting the second SSB on a raster that is different than a synchronization raster.

15. The method of claim 14, wherein the second SSB is at least one of a semi-persistent SSB, a periodic burst SSB, or quasi-located with the TRS using a same cell identifier.

16. The method of claim 1, further comprising:
    establishing a connection with a UE; and
    transmitting information about a TRS for a second base station to the UE.

17. The method of claim 16, wherein the base station comprises a source base station serving the UE and the second base station comprises a target base station in a different multicast area.

18. A method of wireless communication at a user equipment (UE), comprising:
    receiving a tracking reference signal (TRS) from a base station associated with an multicast broadcast single frequency network (MBSFN) area providing a multicast/broadcast service for the UE, the TRS indicating information to maintain continuity of the multicast/broadcast service between different MBSFN areas during mobility of the UE, wherein the information is based on a radio resource control (RRC) state of the UE; and
    receiving the multicast/broadcast service based on the TRS.

19. The method of claim 18, wherein the TRS comprises at least one of an activation of a bandwidth part (BWP) for receiving the multicast/broadcast service by the UE, a switch of a BWP for receiving the multicast/broadcast service by the UE, an identifier (ID) of a cell in which to receive the multicast/broadcast service by the UE, or an ID of a beam via which to receive the multicast/broadcast service by the UE.

20. The method of claim 18, wherein the TRS is a periodic TRS, the method further comprising:
receiving a configuration for periodic TRS parameters in system information or a multicast control channel (MCCH).

21. The method of claim 18, wherein the TRS is a semi-persistent TRS, the method further comprising:
receiving a set of parameters associated with the semi-persistent TRS on a multicast control channel (MCCH) associated with the MBSFN area; and
receiving, in the MBSFN area, a medium access control-control element (MAC-CE) indicating information activating transmission of the semi-persistent TRS for the UE according to the set of parameters.

22. The method of claim 18, wherein the TRS is an aperiodic TRS, the method further comprising:
receiving, in the MBSFN area, a set of parameters associated with the aperiodic TRS on a multicast control channel (MCCH) or via unicast RRC signaling; and
receiving, in downlink (DL) downlink control information (DCI), information indicating transmission of the aperiodic TRS is triggered in the MBSFN area.

23. The method of claim 18, further comprising:
receiving a configuration for a second synchronization signal block (SSB) for the multicast/broadcast service; and
receiving the second SSB on a raster that is different than a synchronization raster.

24. The method of claim 18, further comprising:
establishing a connection with the base station; and
receiving information from the base station about a TRS for a second base station.

25. An apparatus for wireless communication at a base station, comprising:
a memory; and
at least one processor coupled to the memory and configured to:
determine a multicast/broadcast service to be provided to a user equipment (UE) in a multicast broadcast single frequency network (MBSFN) area; and
transmit, to the UE, a tracking reference signal (TRS) indicating a bandwidth part (BWP) associated with the multicast/broadcast service to be provided to the UE, the TRS further indicating information to maintain continuity of the multicast/broadcast service between different MBSFN areas during mobility of the UE, wherein the information is based on a radio resource control (RRC) state of the UE.

26. The apparatus of claim 25, wherein the TRS is a semi-persistent TRS, and wherein the at least one processor is further configured to:
transmit, to the UE on a multicast control channel (MCCH), a set of parameters associated with the semi-persistent TRS; and
transmit, to the UE in a medium access control-control element (MAC-CE), information activating transmission of the semi-persistent TRS for the UE according to the set of parameters.

27. The apparatus of claim 25, wherein the TRS is an aperiodic TRS, and wherein the at least one processor is further configured to:
transmit a set of parameters associated with the aperiodic TRS on a multicast control channel (MCCH) or via unicast RRC signaling; and
transmit in downlink control information (DCI), information triggering the aperiodic TRS.

28. The apparatus of claim 25, wherein the at least one processor is further configured to:
establish a connection with a UE; and
transmit information about a TRS for a second base station to the UE.

29. An apparatus for wireless communication at a user equipment (UE), comprising:
a memory; and
at least one processor coupled to the memory and configured to:
receive a tracking reference signal (TRS) indicating a bandwidth part (BWP) associated with a multicast/broadcast service, the TRS further indicating information to maintain continuity of the multicast/broadcast service between different multicast broadcast single frequency network (MBSFN) areas during mobility of the UE, wherein the information is based on a radio resource control (RRC) state of the UE, and
receive the multicast/broadcast service in a (MBSFN) area.

* * * * *